US012015894B2

(12) United States Patent
Zhou et al.

(10) Patent No.: US 12,015,894 B2
(45) **Date of Patent: *Jun. 18, 2024**

(54) MICROPHONE AND ELECTRONIC DEVICE HAVING THE SAME

(71) Applicant: SHENZHEN SHOKZ CO., LTD., Guangdong (CN)

(72) Inventors: Wenbing Zhou, Shenzhen (CN); Xin Qi, Shenzhen (CN); Fengyun Liao, Shenzhen (CN); Yongshuai Yuan, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,481

(22) Filed: May 10, 2023

(65) Prior Publication Data

US 2023/0283946 A1 Sep. 7, 2023

Related U.S. Application Data

(63) Continuation of application No. 17/651,576, filed on Feb. 18, 2022, now Pat. No. 11,671,746, which is a (Continued)

(30) Foreign Application Priority Data

Jan. 17, 2020 (CN) ......................... 202010051694.7

(51) Int. Cl.

| | |
|---|---|
| ***H04R 1/28*** | (2006.01) |
| ***H04R 1/04*** | (2006.01) |
| ***H04R 1/08*** | (2006.01) |

(52) U.S. Cl.

CPC ............ *H04R 1/2876* (2013.01); *H04R 1/04* (2013.01); *H04R 1/08* (2013.01)

(58) Field of Classification Search

CPC ........... H04R 1/2876; H04R 1/04; H04R 1/08

See application file for complete search history.

(56) References Cited

U.S. PATENT DOCUMENTS 3,654,402 A 4/1972 Roos
2002/0044668 A1 4/2002 Azima
(Continued)

FOREIGN PATENT DOCUMENTS

CN 101646115 A 2/2010
CN 206212213 U 5/2017
(Continued)

OTHER PUBLICATIONS

Wikipedia, Voice frequency, published Mar. 2018, https://web.archive.org/web/20180322073840/https://en.wikipedia.org/wiki/Voice_frequency (Year: 2018).*
(Continued)

*Primary Examiner* — Mark Fischer
(74) *Attorney, Agent, or Firm* — METIS IP LLC

(57) ABSTRACT

The present disclosure relates to microphones and electronic devices having the same. A microphone may include a housing for receiving vibration signals; a converting component inside the housing for converting the vibration signals into electrical signals, and a processing circuit for processing the electrical signals. The converting component may include a transducer and at least one damping film attached to the transducer.

20 Claims, 18 Drawing Sheets

Related U.S. Application Data continuation of application No. 17/171,046, filed on Feb. 9, 2021, now Pat. No. 11,297,416, which is a continuation of application No. PCT/CN2020/079809, filed on Mar. 18, 2020.

(56) References Cited

U.S. PATENT DOCUMENTS

| | | | | |
|---|---|---|---|---|
| 2004/0081326 | A1 | 4/2004 | Michiels | |
| 2005/0238188 | A1* | 10/2005 | Wilcox | H04R 23/008 250/221 |
| 2005/0286729 | A1 | 12/2005 | Harwood et al. | |
| 2008/0240482 | A1 | 10/2008 | Haddad et al. | |
| 2009/0043149 | A1 | 2/2009 | Abel | |
| 2012/0267900 | A1 | 10/2012 | Huffman et al. | |
| 2015/0156594 | A1* | 6/2015 | Bervoets | H04R 25/606 600/25 |
| 2018/0014123 | A1 | 1/2018 | Shajaan et al. | |
| 2018/0077497 | A1 | 3/2018 | Hatipoglu | |
| 2020/0137473 | A1 | 4/2020 | Tsuchihashi et al. | |
| 2021/0176574 | A1* | 6/2021 | Bergs | H04R 17/00 |

FOREIGN PATENT DOCUMENTS

| | | | |
|---|---|---|---|
| CN | 108401201 | A | 8/2018 |
| CN | 110099342 | A | 8/2019 |
| CN | 209806082 | U | 12/2019 |
| EP | 1665679 | B1 | 2/2007 |
| GB | 1219561 | A | 1/1971 |
| WO | 2005006809 | A1 | 1/2005 |

OTHER PUBLICATIONS

Notice of Rejection in Japanese Application No. 2022-540952 mailed on Sep. 4, 2023, 8 pages.

International Search Report in PCT/CN2020/079809 mailed on Oct. 13, 2020, 4 pages.

Written Opinion in PCT/CN2020/079809 mailed on Oct. 13, 2020, 5 pages.

The Extended European Search Report in European Application No. 20914271.0 mailed on Oct. 11, 2022, 7 pages.

Office Action in Russian Application No. 2022119336 mailed on Nov. 22, 2022, 18 pages.

* cited by examiner

MICROPHONE AND ELECTRONIC DEVICE HAVING THE SAME

CROSS-REFERENCE TO RELATED APPLICATIONS

This application is a Continuation of U.S. patent application Ser. No. 17/651,576, filed on Feb. 18, 2022, which is a Continuation of U.S. patent application Ser. No. 17/171,046 (issued as U.S. Pat. No. 11,297,416), filed on Feb. 9, 2021, which is a Continuation of International Application No. PCT/CN2020/079809, filed on Mar. 18, 2020, which claims priority of Chinese Application No. 202010051694.7, filed on Jan. 17, 2020, the contents of each of which are incorporated herein by reference.

TECHNICAL FIELD

The present disclosure generally relates to technical fields of microphones.

BACKGROUND

Microphones are widely used in daily communication devices. In order to achieve good communication quality in different environments, microphones with high signal-to-noise ratios (SNR) and excellent anti-noise performances have become more and more popular. A microphone with excellent performances usually has a smooth frequency response curve and a high SNR. Existing methods for making the smooth frequency response curve smooth often use a flat region before a formant in a displacement resonance curve of a vibration device of a microphone. A resonance frequency of the vibration device may have to be set as a great value, which results in reducing the SNR or the sensitivity and poor communication quality of the microphone. Existing methods for improving the SNR or sensitivity of the microphone often set resonance frequencies to a voice frequency band. Because the vibration device of the microphone has a great Q value (or small damping), picking up a lot of sound signals near the formant frequency (a high peak of the frequency response curve) results in uneven distributions of frequency signal in the whole frequency band, low intelligibility, and even distortion of the sound signals. Thus, it is desirable to provide microphones with high performances, such as high sensitivities, smooth frequency response curves, and wide frequency bands.

SUMMARY

An aspect of the present disclosure introduces a microphone. The microphone may include a housing for receiving vibration signals; a converting component inside the housing for converting the vibration signals into electrical signals, and a processing circuit for processing the electrical signals. The converting component may include a transducer and at least one damping film attached to the transducer.

In some embodiments, the at least one damping film covers at least part of at least one surface of the transducer.

In some embodiments, the at least one surface of the transducer includes at least one of an upper surface, a lower surface of the transducer, a lateral surface, or an internal surface.

In some embodiments, the at least one damping film is disposed on at least one position including an upper surface of the transducer, a lower surface of the transducer, a lateral surface of the transducer, or an interior of the transducer.

In some embodiments, the at least one damping film is disposed on at least one surface of the transducer at a predetermined angle.

In some embodiments, the at least one damping film is not connected to the housing.

In some embodiments, the at least one damping film is connected to the housing.

In some embodiments, the at least one damping film includes at least two damping films, and the at least two damping films are arranged symmetrically with respect to a center line of the transducer.

In some embodiments, the converting component further includes at least one elastic element, wherein the at least one damping film is connected to the transducer and the at least one elastic element respectively.

In some embodiments, the at least one elastic element and the transducer are arranged in a predetermined distribution mode.

In some embodiments, the predetermined distribution mode includes at least one of a horizontal distribution mode, a vertical distribution mode, an array distribution mode, or a random distribution mode.

In some embodiments, the at least one damping film covers at least part of at least one surface of the at least one elastic element.

In some embodiments, a width of the at least one damping film is variable.

In some embodiments, a thickness of the at least one damping film is variable.

In some embodiments, the transducer includes at least one of a diaphragm, a piezo ceramic plate, a piezo film, or an electrostatic film.

In some embodiments, a structure of the transducer includes at least one of a film, a cantilever, or a plate.

In some embodiments, the vibration signals are caused by at least one of: gas, liquid, or solid.

In some embodiments, the vibration signals are transmitted from the housing to the converting component according to a non-contact mode or a contact mode.

In some embodiments, the transducer and the at least one damping film are designed according to a frequency response curve of the microphone.

According to another aspect of the present disclosure, an electronic device comprising a microphone is provided. The microphone may include a housing for receiving vibration signals; a converting component inside the housing for converting the vibration signals into electrical signals, and a processing circuit for processing the electrical signals. The converting component may include a transducer and at least one damping film attached to the transducer.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
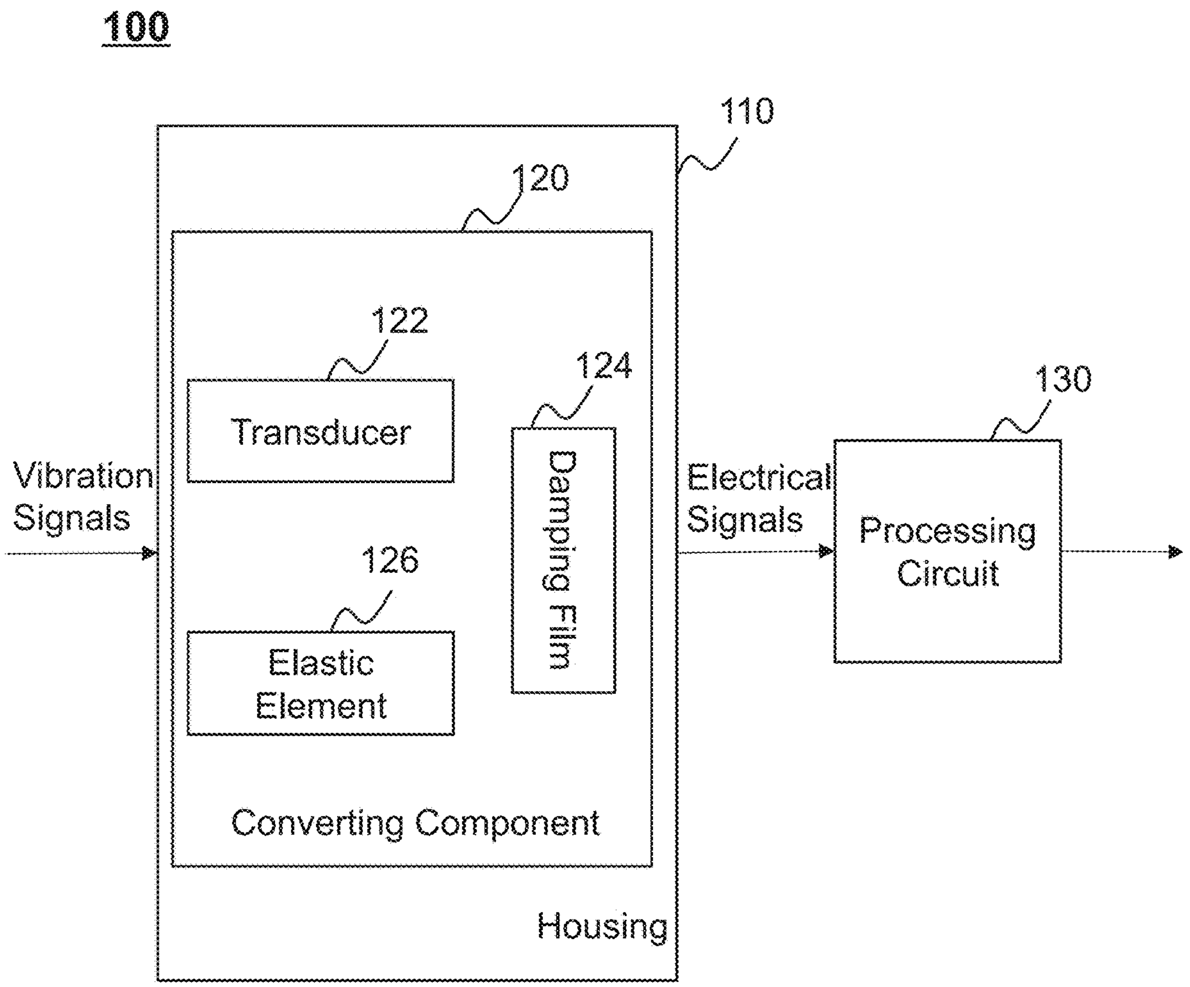
FIG. 1 is a block diagram illustrating an exemplary microphone according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to microphones and electronic devices having the same. To this end, a microphone may use damping materials in form of a film to cover at least part of at least one surface of a transducer to form a converting component for converting vibration signals into electrical signals. For example, the transducer may be a cantilever, and the microphone may include at least one damping film completely covering the at least one surface of the cantilever. As another example, the at least one damping film may be disposed on the at least one surface of the transducer at a predetermined angle. The microphone may further include at least one elastic element. The at least one damping film may be connected to the transducer and the at least one elastic element respectively. In this way, the microphone may have good performance in communication quality, such as high sensitivities, smooth frequency response curves, and wide frequency bands. In addition, the microphone may have high reliability and be easy to achieve in manufacture.

FIG. 1 is a block diagram illustrating an exemplary microphone 100 according to some embodiments of the present disclosure. For example, microphone 100 may be a microphone of an electronic device, such as a telephone, an earphone, a headphone, a wearable device, a smart mobile device, a virtual reality device, an augmented reality device, a computer, a laptop, etc. The microphone 100 may include a housing 110, a converting component 120 inside the housing 110, and a processing circuit 130.

In some embodiments, the housing 110 may be configured to receive vibration signals. In some embodiments, the housing 110 may receive the vibration signals from a vibration source that generates the vibration signals in a contact mode. In some embodiments, the housing 110 may receive the vibration signals from the vibration source in a non-contact mode. For example, the housing 110 may receive the vibration signals via a medium, such as air, solid, liquid, etc. In some embodiments, the vibration source may include any device or individual generating vibrations to be detected. For example, the vibration source may include a human body, a musical instrument, a machine, or the like, or any combination thereof. In some embodiments, the vibration signals may include air vibration signals, solid vibration signals, liquid vibration signals, or the like, or any combination thereof.

In some embodiments, the housing 110 may transmit the vibration signals to the converting component 120 in a contact mode or a non-contact mode. For example, the converting component 120 may be inside the housing 110 and touch the housing 110. The converting component 120 may receive the vibration signals from the housing 110 directly. As another example, the converting component 120 may not touch the housing 110. The converting component 120 may receive the vibration signals from the housing 110 via a medium, such as air, solid, liquid, etc.

In some embodiments, the converting component 120 may be configured to converting the vibration signals into electrical signals. In some embodiments, the converting component 120 may receive the vibration signals and generate the electrical signals by deforming a structure of the converting component 120. In some embodiments, the converting component 120 may include at least one transducer 122, at least one damping film 124, and at least one elastic element 126. For example, the converting component 120 may only include a transducer 122. As another example, the converting component 120 may include a transducer 122 and a damping film 124 attached to the transducer 122. As another example, the converting component 120 may include a transducer 122, an elastic element 126, and a damping film 124 connected to the transducer 122 and the elastic element 126. As still another example, the converting component 120 may include at least two transducers 122, at least two elastic elements 126, and at least two damping films 124.

In some embodiments, the at least one transducer 122 may be configured to converting the vibration signals into the electrical signals. For example, the vibration signals may be transmitted from the housing 110 and cause the at least one transducer 122 deformed to output the electrical signals. In some embodiments, a signal conversion type of the at least one transducer 122 may include an electromagnetic type (e.g., a moving-coil type, a moving-iron type, etc.), a piezoelectric type, an inversed piezoelectric type, an electrostatic type, an electret type, a planar magnetic type, a balanced armature type, a thermoacoustic type, or the like, or any combination thereof. In some embodiments, the at least one transducer 122 may include a diaphragm, a piezo ceramic plate, a piezo film, an electrostatic film, or the like, or any combination thereof. In some embodiments, a shape of the at least one transducer 122 may be variable. For example, the shape of the at least one transducer 122 may include a circle, a rectangle, a square, an oval, or the like, or any combination thereof. In some embodiments, a structure of the at least one transducer 122 may be variable. For example, the structure of the at least one transducer 122 may include a film, a cantilever, a plate, or the like, or any combination thereof.

In some embodiments, only one of the at least one transducer 122 may be configured to output electrical signals, and remaining of the at least one transducer 122 may be configured to act as elastic elements to deform in response to the vibration signals. Each of the remaining of the at least one transducer 122 may contribute a resonance peak for the frequency response curve of the microphone 100.

In some embodiments, the at least one damping film 124 may be configured to change a composite damping and/or a composite weight of the converting component 120 to adjust a frequency response curve of the converting component 120. For example, the at least one damping film 124 may adjust the composite damping of the converting component 120 to make the converting component 120 have a predetermined Q value and a flat frequency response curve. As another example, the at least one damping film 124 may adjust the composite weight of the converting component 120 and resonant frequency of the frequency response curve of the converting component 120. It should be noted that the at least one damping film 124 is merely provided for the purposes of illustration, and not intended to limit the scope of the present disclosure. The damping in the microphone 100 may be in any other structure. For example, the structure of the damping in the microphone 100 may include a film, a block, a complex structure, or the like, or any combination thereof. In some embodiments, the at least one damping film 124 may be configured to transmit vibrations of the at least one elastic element 126 to the at least one transducer 122. A plurality of equivalent resonance peaks may be generated.

In some embodiments, the at least one elastic element 126 may be configured to change vibration performances of the converting component 120. In some embodiments, a material of the at least one damping film 124 may include metal, inorganic nonmetal, polymer materials, composite materials, or the like, or any combination thereof. In some embodiments, the at least one damping film 124 may be connected to the at least one transducer 122 and the at least one elastic element 126, respectively. For example, the at least one damping film 124 may transmit vibration signals generated by the at least one elastic element 126 to the at least one transducer 122.

In some embodiments, the processing circuit 130 may be configured to process the electrical signals.

Figure 2:
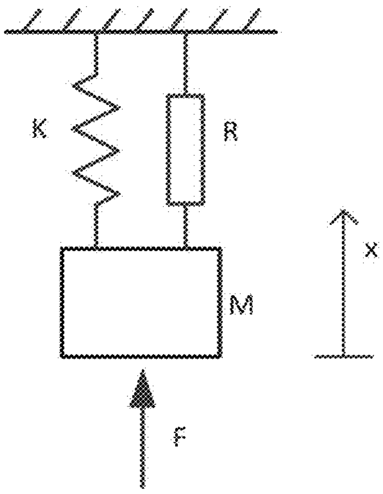
FIG. 2 is a schematic diagram illustrating an exemplary spring-mass-damper system of a converting component according to some embodiments of the present disclosure.

FIG. 2 is a schematic diagram illustrating an exemplary spring-mass-damper system of a converting component 120 according to some embodiments of the present disclosure. In a microphone, a converting component thereof may be simplified and equivalent to a spring-mass-damper system as shown in FIG. 2. When the microphone works, the spring-mass-damper system may be forced to vibrate under an excitation force.

As shown in FIG. 2, the spring-mass-damper system may be moved according to a differential equation (1):

$$M\frac{d^2x}{dt^2} + R\frac{dx}{dt} + Kx = F\cos\omega, \tag{1}$$

wherein M denotes a mass of the spring-mass-damper system, x denotes a displacement of the spring-mass-damper system, R denotes a damping of the spring-mass-damper system, K denotes an elastic coefficient of the spring-mass-damper system, F denotes an amplitude of a driving force, and ω denotes a circular frequency of an external force.

The differential equation (1) may be solved to obtain displacements under steady-state (2):

$$x=x_a \cos(\omega t-\theta) \tag{2},$$

wherein x denotes a deformation of the spring-mass-damper system when the microphone works, which equals to a value of an output electrical signal, $$x_a = \frac{F}{\omega|Z|} = \frac{F}{\omega\sqrt{R^2 + (\omega M - K\omega^{-1})^2}},$$

$x_a$ denotes an output displacement, Z denotes a mechanical impedance, and θ denotes an oscillation phase.

Normalization of a ratio A of displacement amplitudes may be described as equation (3):

$$A = \frac{x_a}{x_{a0}} = \frac{Q_m}{\sqrt{\frac{f^2}{f_0} + \left(\frac{f^2}{f_0} - 1\right)^2 Q_m^2}}, \quad (3)$$

wherein $$x_{a0} = \frac{F}{K},$$

$x_{a0}$ denotes a displacement amplitude under steady-state (or a displacement amplitude when ω=0), $$\frac{f}{f_0} = \frac{\omega}{\omega_0}, \frac{f}{f_0}$$

denotes a ratio of a frequency of a an external force to a natural frequency, $\omega_0$=K/M, $\omega_0$ denotes a circular frequency of a vibration, $$Q_m = \frac{\omega_0 M}{R},$$

and $Q_m$ denotes a mechanical quality factor.

Figure 3:
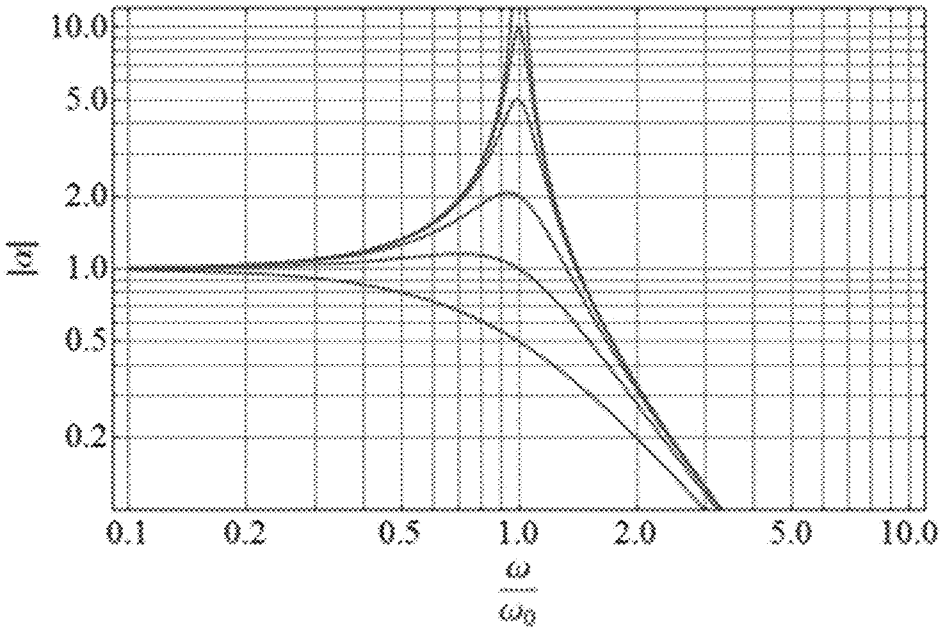
FIG. 3 is a schematic diagram illustrating exemplary normalization of displacement resonance curves of spring-mass-damper systems according to some embodiments of the present disclosure.

FIG. 3 is a schematic diagram illustrating exemplary normalization of displacement resonance curves of spring-mass-damper systems according to some embodiments of the present disclosure.

The microphone 100 generates voltage signals by relative displacement between the converting component 120 and the housing 110. For example, an electret microphone generates voltage signals according to a distance change between a deformed diaphragm transducer and a substrate. As another example, a cantilever bone conduction microphone may generate electrical signals according to an inverse piezoelectric effect caused by a deformed cantilever transducer. In some embodiments, the greater of a displacement that the transducer deforms, the greater the electrical signal that the microphone outputs. As shown in FIG. 3, the smaller of a damping (e.g., a material damping, a structural damping, etc.) of the converting component, the greater of the Q value, and the narrower of a 3 dB bandwidth at a resonance peak of the displacement resonance curve. In some embodiments, the resonance peak may not be set in a voice frequency range in a microphone with excellent performances.

Figure 4:
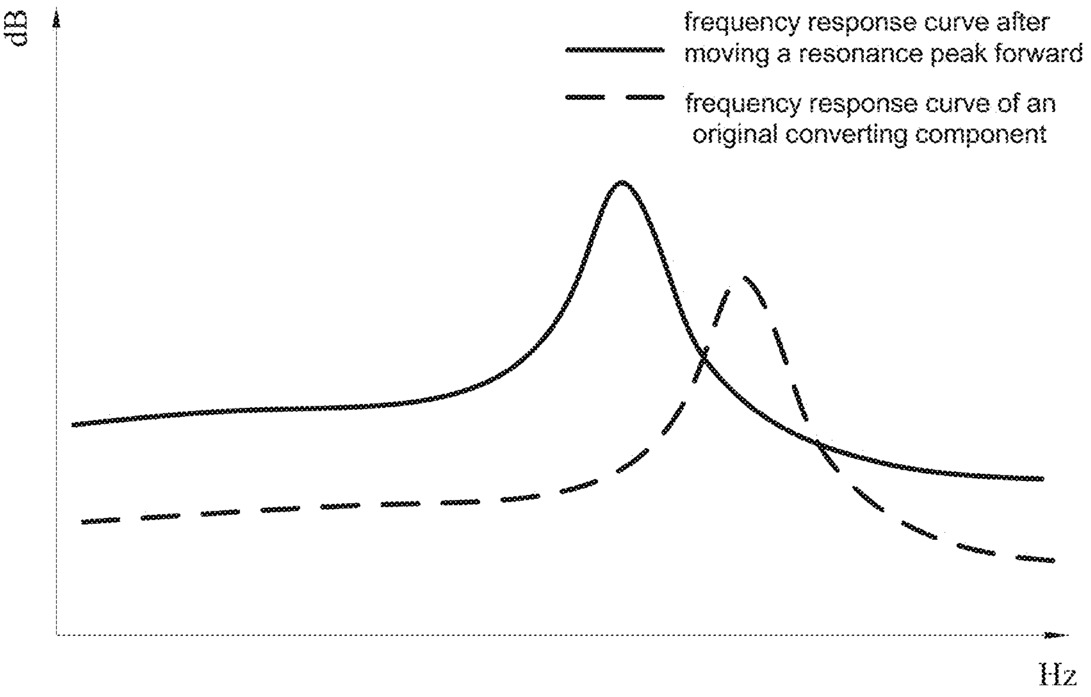
FIG. 4 is a schematic diagram illustrating an exemplary frequency response curve of an original converting component and an exemplary frequency response curve after moving a resonance peak forward of the original converting component according to some embodiments of the present disclosure.

FIG. 4 is a schematic diagram illustrating an exemplary frequency response curve of an original converting component 120 and an exemplary frequency response curve after moving a resonance peak forward of the original converting component 120 according to some embodiments of the present disclosure. In some embodiments, as shown in FIG. 4, in order to improve a whole sensitivity of the microphone, the natural frequency of the converting component 120 may be brought forward by moving the resonance peak forward to the voice frequency range to improve the sensitivity of the microphone before the resonance peak. The output displacement $x_a$ may be determined according to equation (4):

$$x_a = \frac{F}{\omega|Z|} = \frac{F}{\omega\sqrt{R^2 + (\omega M - K\omega^{-1})^2}}, \quad (4)$$

according to equation (4), if $\omega<\omega_0$, $\omega M<K\omega^{-1}$. If decreasing $\omega_0$ of the converting component 120 by increasing M and/or decreasing K, $|\omega M<K\omega^{-1}|$ may decrease, and the corresponding output displacement $x_a$ may increase. If $\omega=\omega_0$, $\omega M=K\omega^{-1}$. The output displacement $x_a$ may be constant if decreasing or increasing $\omega_0$ of the converting component 120. If $\omega>\omega_0$, $\omega M>K\omega^{-1}$. If decreasing $\omega_0$ of the converting component 120 by increasing M and/or decreasing K, $|\omega M<K\omega^{-1}|$ may increase, and the corresponding output displacement $x_a$ may decrease.

In some embodiments, as the resonance peak moving forward, the resonance peak may appear in the voice frequency range. If picking up a plurality of signals near the resonance peak, the communication quality may be bad. In some embodiments, adding damping to the converting component 120 may increase energy loss, especially energy loss near the resonance peak, during vibration. A reciprocal of Q value may be described according to equation (5):

$$Q^{-1} = \frac{\Delta f}{\sqrt{3} f_0}, \quad (5)$$

wherein $Q^{-1}$ denotes the reciprocal of Q value, Δf denotes a 3 dB bandwidth (a difference value of two frequencies f1, f2 at half of the resonance amplitude, respectively, Δf=f1−f2), and f0 denotes a resonance frequency.

Figure 5:
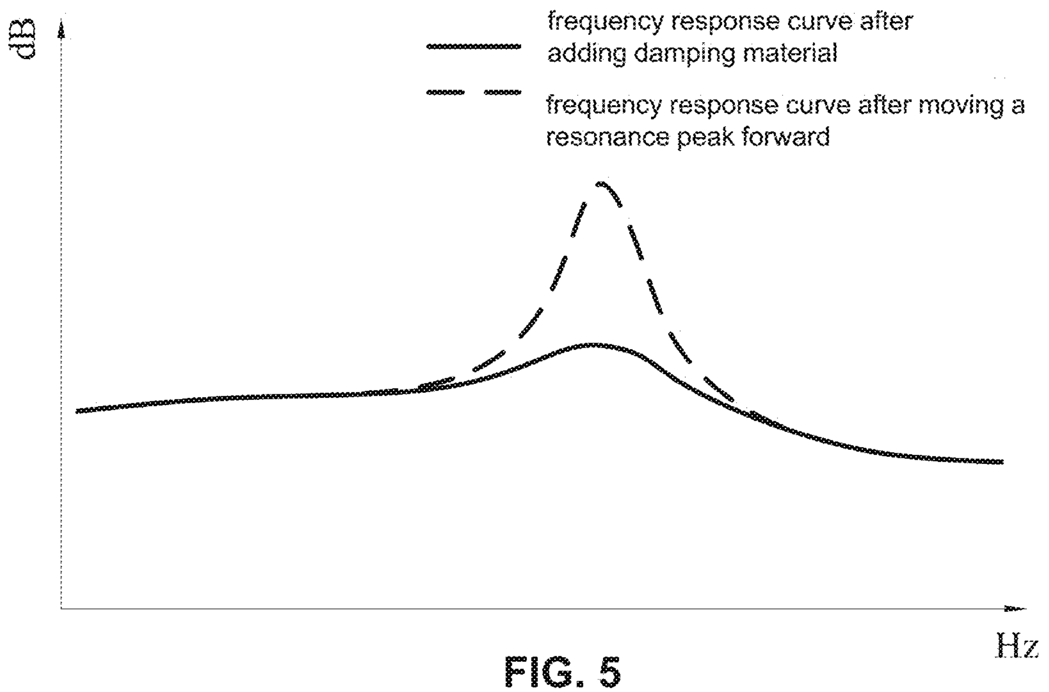
FIG. 5 is a schematic diagram illustrating an exemplary frequency response curve after moving a resonance peak forward of a converting component and an exemplary frequency response curve after adding damping material in the converting component according to some embodiments of the present disclosure.

As the damping of the converting component 120 increases, Q value decreases, and the corresponding 3 dB bandwidth increases. In some embodiments, the damping may be not constant during a deforming process and may be great under great force or great amplitude. Amplitudes in a non-resonance area may be small and amplitudes in a resonance area may be great. FIG. 5 is a schematic diagram illustrating an exemplary frequency response curve after moving a resonance peak forward of a converting component 120 and an exemplary frequency response curve after adding damping material in the converting component 120 according to some embodiments of the present disclosure. As shown in FIG. 5, the sensitivity of the microphone in the non-resonance area may not decrease, and Q value in the resonance area may decrease by adding a suitable damping in the converting component 120. The frequency response curve may be flat.

In some embodiments, the microphone 100 may be designed according to different application scenes. For example, if the microphone 100 is applied to an application scene that requires to have a small volume and low sensitivity, the microphone 100 may be designed to include a transducer 122 and a damping film 124 of the converting component 120 in the housing 110.

Figure 6:
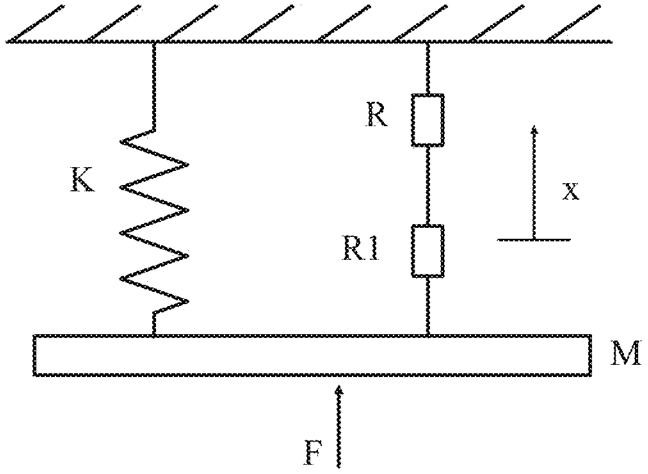
FIG. 6 is a schematic diagram illustrating an exemplary equivalent model of a converting component including a transducer and a damping film according to some embodiments of the present disclosure.

FIG. 6 is a schematic diagram illustrating an exemplary equivalent model of a converting component 120 including a transducer 122 and a damping film 124 according to some embodiments of the present disclosure. As shown in FIG. 6, R denotes a damping of the transducer 122, K denotes an elastic coefficient of the transducer 122, and R1 denotes an additional damping of the damping film 124. In some embodiments, the composite damping of the converting component 120 may increase by adding the damping film 124. The damping of the converting component 120 may be changed.

Figure 7:
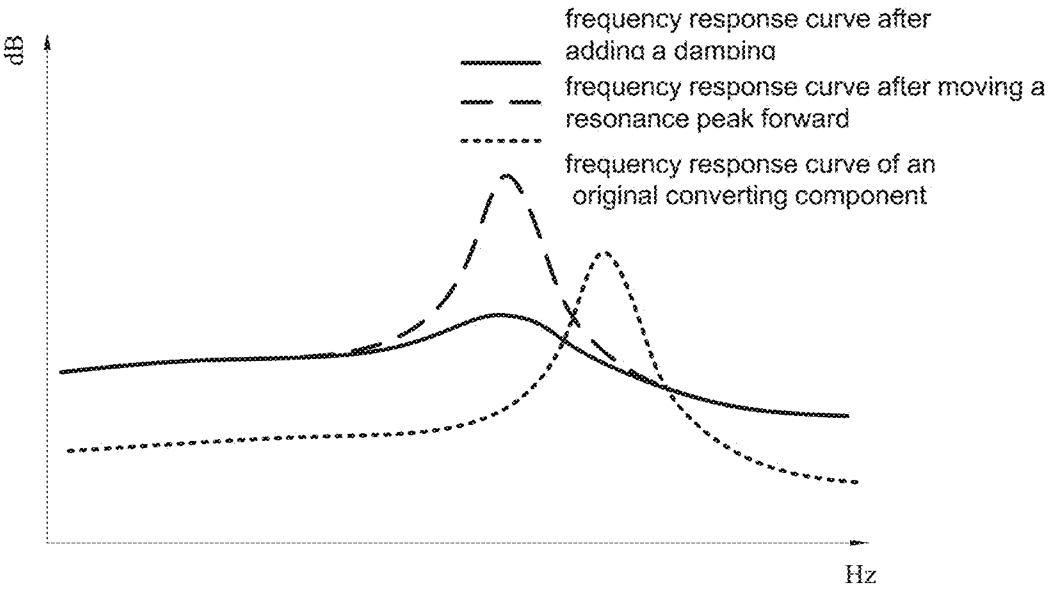
FIG. 7 is a schematic diagram illustrating an exemplary frequency response curve of an original converting component, an exemplary frequency response curve after moving a resonance peak forward of the original converting component, and an exemplary frequency response curve after adding damping material in the converting component according to some embodiments of the present disclosure.

FIG. 7 is a schematic diagram illustrating an exemplary frequency response curve of an original converting component 120, an exemplary frequency response curve after moving a resonance peak forward of the original converting component 120, and an exemplary frequency response curve after adding damping material in the converting component 120 according to some embodiments of the present disclosure. As shown in FIG. 7, the Q value at the resonance peak may decrease and the sensitivities of frequencies other than the resonance peak may not decrease and even increase. In some embodiments, the sensitivity of the microphone 100 may increase and the frequency response curve may be flat by moving the resonance peak forward to the voice frequency range, which improves the performances of the microphone 100.

In some embodiments, the microphone 100 may be designed to include a transducer 122, a damping film 124, and an elastic element 126 of the converting component 120 in the housing 110. In some embodiments, the elastic element 126 and the transducer 122 may each have a resonance peak. The damping film 124 may be connected to the elastic element 126 and the transducer 122, respectively, to transmit vibrations of the elastic element 126 to the transducer 122. In some embodiments, the microphone 100 including the transducer 122, the damping film 124, and the elastic element 126 may output a frequency response curve with two resonance peaks.

Figure 8:
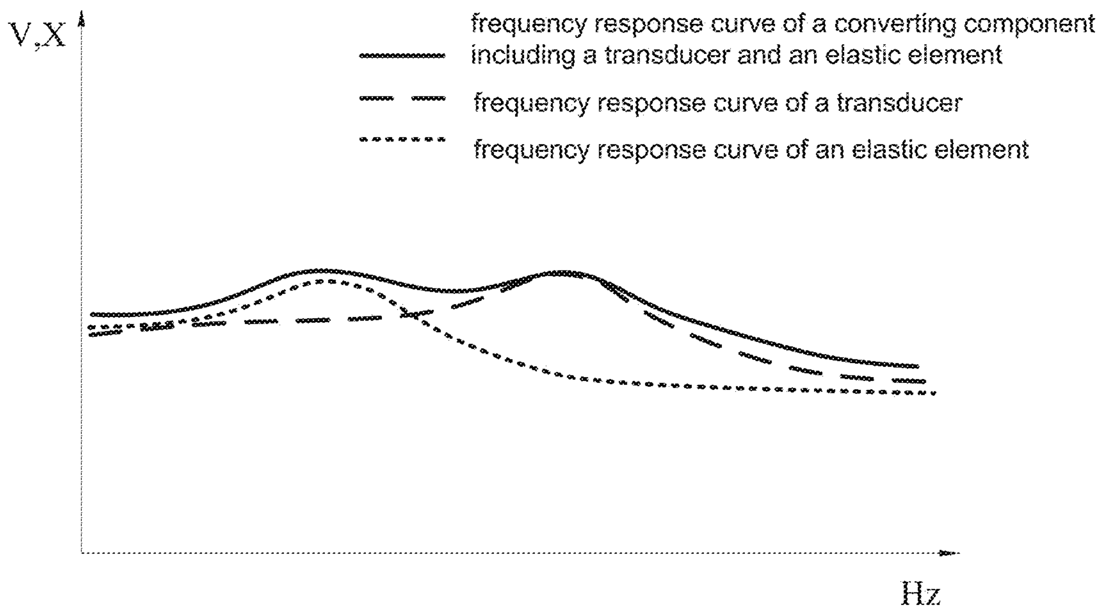
FIG. 8 is a schematic diagram illustrating an exemplary frequency response curve of a transducer, an exemplary frequency response curve of an elastic element, and an exemplary frequency response curve of a converting component including the transducer and the elastic element according to some embodiments of the present disclosure.

FIG. 8 is a schematic diagram illustrating an exemplary frequency response curve of a transducer 122, an exemplary frequency response curve of an elastic element 126, and an exemplary frequency response curve of a converting component 120 including the transducer 122 and the elastic element 126 according to some embodiments of the present disclosure. In some embodiments, the elastic element 126 may be designed according to different application scenes. For example, the elastic element 126 may be designed as a suitable structure. A first-order resonance frequency of the elastic element 126 may be within a predetermined voice frequency range. The elastic element 126 may contribute a resonance peak for the microphone 100 using the first-order resonance frequency of the elastic element 126. In some embodiments, the elastic element 126 with a suitable structure may contribute a plurality of resonance peaks within the predetermined voice frequency range. In some embodiments, the damping of the damping film 124 may be designed to achieve a microphone 100 with a high sensitivity, a great Q value, and two resonance peaks in the frequency response curve of the microphone 100 as shown in FIG. 8.

In some embodiments, the microphone 100 may be designed to include a transducer 122, a plurality of damping films 124, and a plurality of elastic elements 126 of the converting component 120 in the housing 110. In some embodiments, each damping film 124 may be connected to an elastic element 126 and the transducer 122, respectively, to transmit vibrations of the corresponding elastic element 126 to the transducer 122. In some embodiments, the microphone 100 including the transducer 122, the plurality of damping films 124, and the plurality of elastic elements 126 may output a frequency response curve with a plurality of resonance peaks. In some embodiments, the damping of each of the plurality of damping films 124 may be designed to adjust a Q vale of each resonance peak of the frequency response curve.

Figure 9:
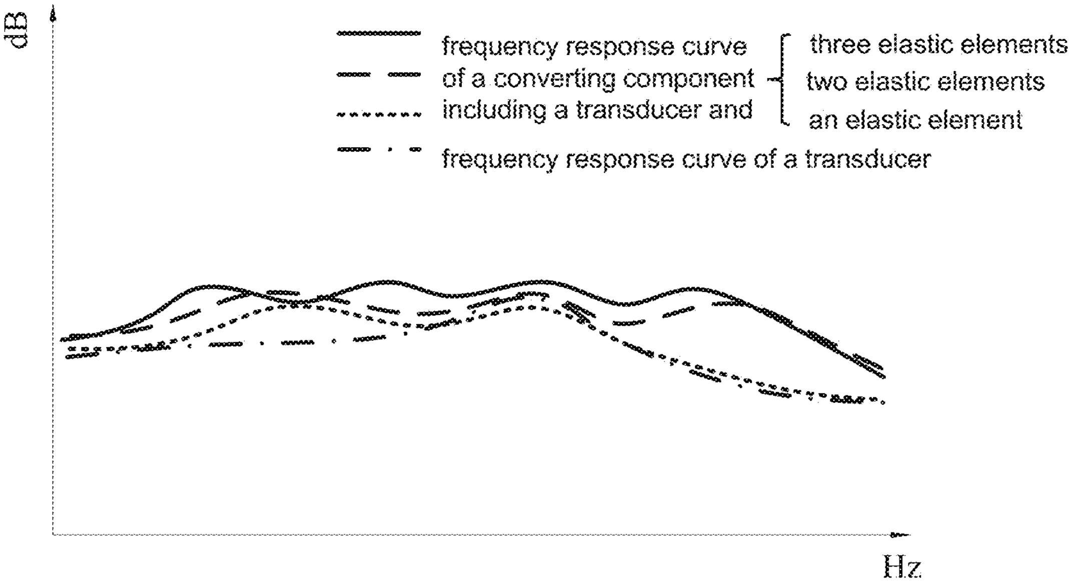
FIG. 9 is a schematic diagram illustrating an exemplary frequency response curve of a transducer, an exemplary frequency response curve of a converting component including a transducer and an elastic element, an exemplary frequency response curve of a converting component including a transducer and two elastic elements, and an exemplary frequency response curve of a converting component including a transducer and three elastic elements according to some embodiments of the present disclosure.

FIG. 9 is a schematic diagram illustrating an exemplary frequency response curve of a transducer 122, an exemplary frequency response curve of a converting component 120 including a transducer 122 and an elastic element 126, an exemplary frequency response curve of a converting component 120 including a transducer 122 and two elastic elements 126, and an exemplary frequency response curve of a converting component 120 including a transducer 122 and three elastic elements 126 according to some embodiments of the present disclosure. As shown in FIG. 9, each resonance frequency of each elastic element 126 may be different from each other and be within the predetermined voice frequency range. The sensitivities within the whole predetermined voice frequency range may be high and the frequency response curve of the microphone 100 may be flat.

In some embodiments, the interior structures of the microphone 100 and the layouts of each part inside the microphone 100 may be designed according to different application scenes. For example, the microphone 100 may be designed according to a position where the microphone 100 put (e.g., in front of ears of a human, behind ears of a human, on a neck of a human, etc.). As another example, the microphone 100 may be designed according to a conduction mode (e.g., a bone conduction mode, an air conduction mode, etc.) of the microphone 100. As still another example, the microphone 100 may be designed according to frequencies of different signals (e.g., voice signals of humans, sound signals of a machine, etc.) that the microphone 100 acquires. As still another example, the microphone 100 may be designed according to production processes of the microphone 100. In some embodiments, a size, a shape, an installation position, a layout, a structure, a count of the at least one transducer 122, the at least one damping film 124, and/or the at least one elastic element 126 may be determined according to different application scenes. For example, the transducer 122 and the at least one damping film 124 of the microphone 100 may be designed according to a frequency response curve of the microphone 100.

In some embodiments, the at least one damping film 124 may be disposed on any position of the at least one transducer 122. For example, the at least one damping film 124 may be disposed on an upper surface of the at least one transducer 122, a lower surface of the at least one transducer 122, a lateral surface of the at least one transducer 122, an interior of the at least one transducer 122, or the like, or any combination thereof. In some embodiments, the at least one damping film 124 may cover at least part of at least one surface of the at least one transducer 122. For example, a damping film 124 of the at least one damping film 124 may cover all surface of a transducer 122 of the at least one transducer 122. As another example, a damping film 124 of the at least one damping film 124 may cover a part of a surface of a transducer 122 of the at least one transducer 122. In some embodiments, the at least one surface of a transducer 122 may include an upper surface of the transducer 122, a lower surface of the transducer 122, a lateral surface of the transducer 122, an internal surface of the transducer 122, or the like, or any combination thereof.

In some embodiments, the at least one damping film 124 may connect to the at least one transducer 122 and may not connect to the housing 110. In some embodiments, the connection between any two parts inside the microphone 100 may include bonding, riveting, thread connection, integral forming, suction connection, or the like, or any combination thereof.

Figure 10:
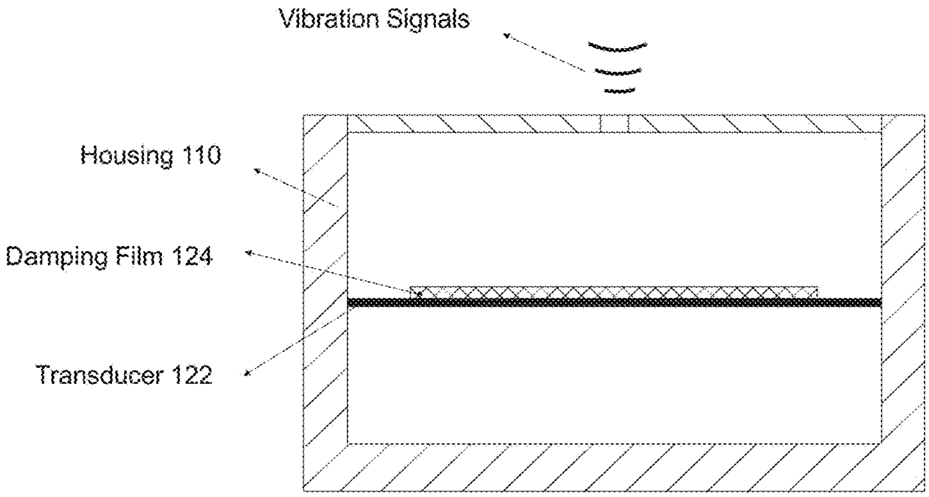
FIG. 10 is a structural schematic diagram illustrating an exemplary microphone according to some embodiments of the present disclosure.

FIG. 10 is a structural schematic diagram illustrating an exemplary microphone 100 according to some embodiments of the present disclosure. As shown in FIG. 10, the microphone 100 may include a housing 110, a transducer 122 connecting to the housing 110, and a damping film 124 connected to the transducer 122 and disconnected to the housing 110. The transducer 122 may fix to the housing 110 at two ends of the transducer 122. The damping film 124 may cover part of an upper surface of the transducer 122.

Figure 11:
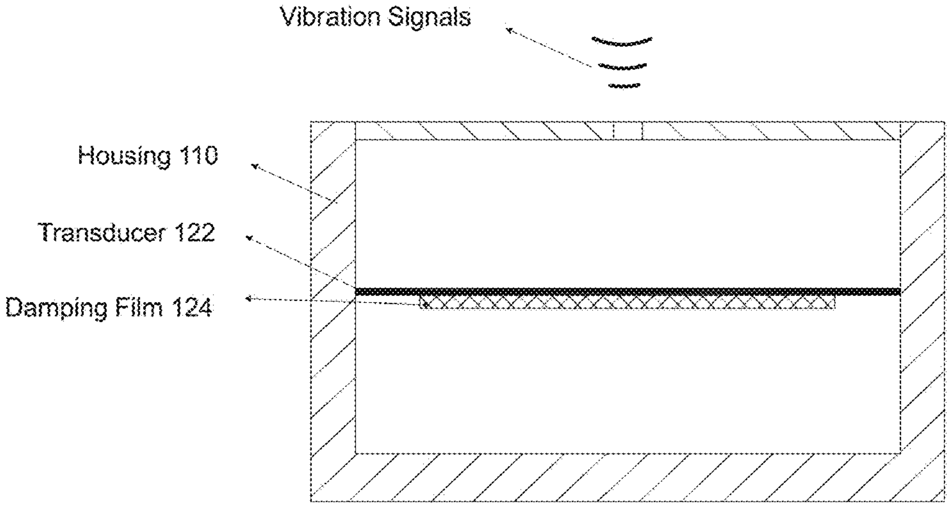
FIG. 11 is a structural schematic diagram illustrating an exemplary microphone according to some embodiments of the present disclosure.

FIG. 11 is a structural schematic diagram illustrating an exemplary microphone 100 according to some embodiments of the present disclosure. As shown in FIG. 11, the microphone 100 may include a housing 110, a transducer 122 connecting to the housing 110, and a damping film 124 connected to the transducer 122 and disconnected to the housing 110. The transducer 122 may fix to the housing 110 at two ends of the transducer 122. The damping film 124 may cover part of a lower surface of the transducer 122.

Figure 12:
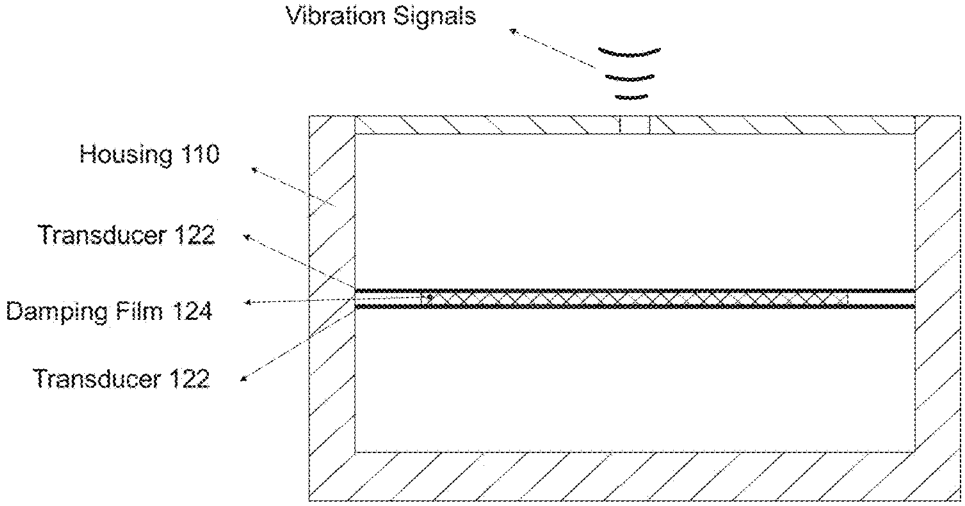
FIG. 12 is a structural schematic diagram illustrating an exemplary microphone according to some embodiments of the present disclosure.

FIG. 12 is a structural schematic diagram illustrating an exemplary microphone 100 according to some embodiments of the present disclosure. As shown in FIG. 12, the microphone 100 may include a housing 110, two transducers 122 connecting to the housing 110, respectively, and a damping film 124 connected to the transducers 122 and disconnected to the housing 110. Each of the two transducers 122 may fix to the housing 110 at two ends of the transducer 122. The damping film 124 may cover part of an upper surface of one of the two transducers 122 and part of a lower surface of the other of the two transducers 122. As shown in FIG. 12, the two transducers 122 and the damping film 124 may form a sandwich. The damping film 124 may sandwich between the two transducers 122.

Figure 13:
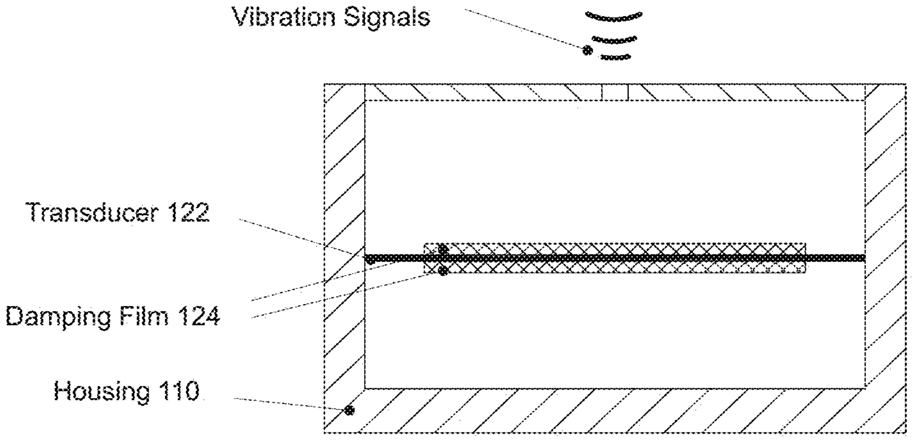
FIG. 13 is a structural schematic diagram illustrating an exemplary microphone according to some embodiments of the present disclosure.

FIG. 13 is a structural schematic diagram illustrating an exemplary microphone 100 according to some embodiments of the present disclosure. As shown in FIG. 13, the microphone 100 may include a housing 110, a transducer 122 connecting to the housing 110, and two damping films 124 connected to the transducer 122, respectively, and disconnected to the housing 110. The transducer 122 may fix to the housing 110 at two ends of the transducer 122. The two damping films 124 may cover part of an upper surface and a lower surface of the transducer 122, respectively.

Figure 14:
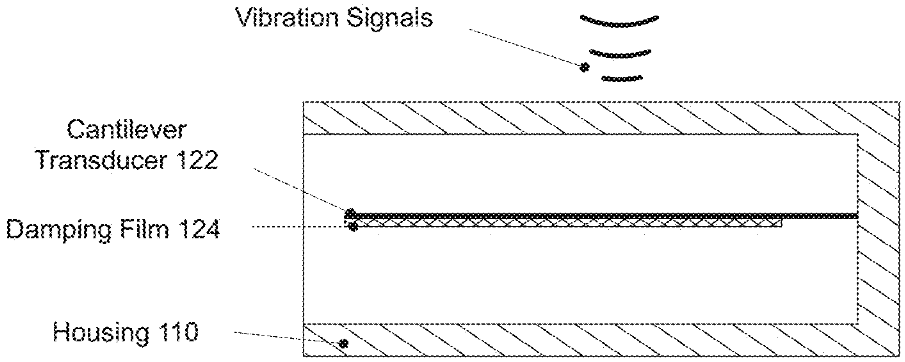
FIG. 14 is a structural schematic diagram illustrating an exemplary microphone according to some embodiments of the present disclosure.

FIG. 14 is a structural schematic diagram illustrating an exemplary microphone 100 according to some embodiments of the present disclosure. As shown in FIG. 14, the microphone 100 may include a housing 110, a cantilever transducer 122 connecting to the housing 110, and a damping film 124 connected to the transducer 122 and disconnected to the housing 110. The cantilever transducer 122 may fix to the housing 110 at an end of the cantilever transducer 122. The damping film 124 may cover part of a lower surface of the cantilever transducer 122.

Figure 15:
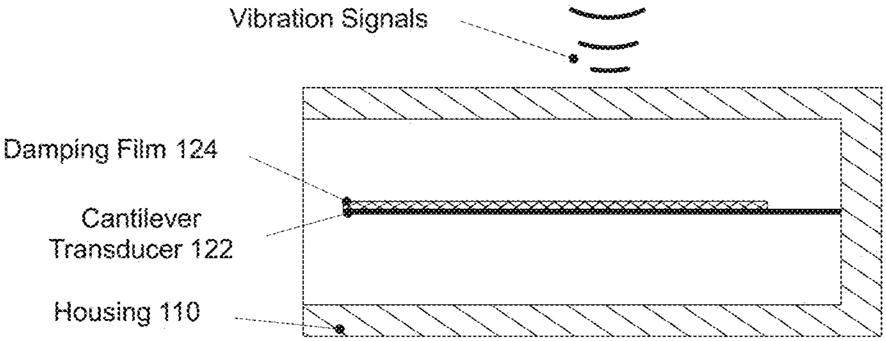
FIG. 15 is a structural schematic diagram illustrating an exemplary microphone according to some embodiments of the present disclosure.

FIG. 15 is a structural schematic diagram illustrating an exemplary microphone 100 according to some embodiments of the present disclosure. As shown in FIG. 15, the microphone 100 may include a housing 110, a cantilever transducer 122 connecting to the housing 110, and a damping film 124 connected to the transducer 122 and disconnected to the housing 110. The cantilever transducer 122 may fix to the housing 110 at an end of the cantilever transducer 122. The damping film 124 may cover part of an upper surface of the cantilever transducer 122.

Figure 16:
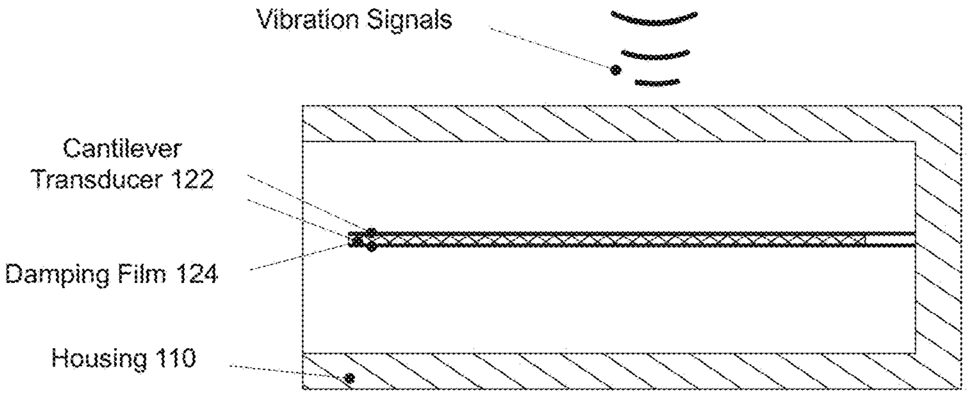
FIG. 16 is a structural schematic diagram illustrating an exemplary microphone according to some embodiments of the present disclosure.

FIG. 16 is a structural schematic diagram illustrating an exemplary microphone 100 according to some embodiments of the present disclosure. As shown in FIG. 16, the microphone 100 may include a housing 110, two cantilever transducers 122 connecting to the housing 110, respectively, and a damping film 124 connected to the cantilever transducers 122 and disconnected to the housing 110. Each of the two cantilever transducers 122 may fix to the housing 110 at an end of each cantilever transducer 122. The damping film 124 may cover part of an upper surface of one of the two cantilever transducers 122 and part of a lower surface of the other of the two cantilever transducers 122. As shown in FIG. 16, the two cantilever transducers 122 and the damping film 124 may form a sandwich. The damping film 124 may sandwich between the two cantilever transducers 122.

Figure 17:
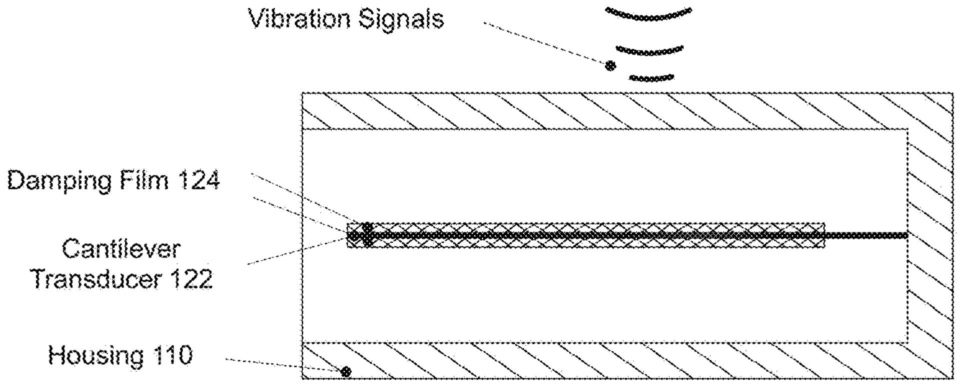
FIG. 17 is a structural schematic diagram illustrating an exemplary microphone according to some embodiments of the present disclosure.

FIG. 17 is a structural schematic diagram illustrating an exemplary microphone 100 according to some embodiments of the present disclosure. As shown in FIG. 17, the microphone 100 may include a housing 110, a cantilever transducer 122 connecting to the housing 110, and two damping films 124 connected to the cantilever transducer 122, respectively, and disconnected to the housing 110. The cantilever transducer 122 may fix to the housing 110 at an end of the cantilever transducer 122. The two damping films 124 may cover part of an upper surface and a lower surface of the cantilever transducer 122, respectively.

Figure 18:
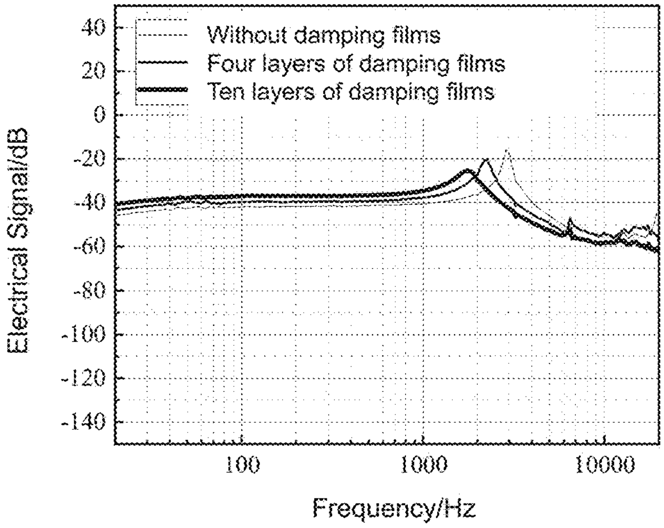
FIG. 18 is a schematic diagram illustrating exemplary frequency response curves of a microphone when damping films are disconnected to at least one transducer thereof according to some embodiments of the present disclosure.

FIG. 18 is a schematic diagram illustrating exemplary frequency response curves of a microphone 100 when damping films 124 are disconnected to at least one transducer 122 thereof according to some embodiments of the present disclosure. The frequency response curves of a microphone 100 without damping films 124, a microphone 100 including four layers of damping films 124, and a microphone 100 including ten layers of damping films 124 may be different. As shown in FIG. 18, the resonance peak moves forward, sensitivities before the resonance peak improves, and Q value at the resonance peak decreases as a count of layers of damping films 124 increases. The more the damping films 124, the less of the frequency at the resonance peak, the higher sensitivities before the resonance peak, and the smaller of the Q value at the resonance peak. Therefore, in order to achieve actual demands (e.g., the sensitivity, the Q value at the resonance peak, the frequency at the resonance peak, etc.) of the microphone 100, the microphone 100 may be designed to include a damping film 124 or a plurality of damping films 124.

In some embodiments, the at least one damping film 124 may connect to both the at least one transducer 122 and the housing 110. In some embodiments, the connection between any two parts inside the microphone 100 may include bonding, riveting, thread connection, integral forming, suction connection, or the like, or any combination thereof.

Figure 19:
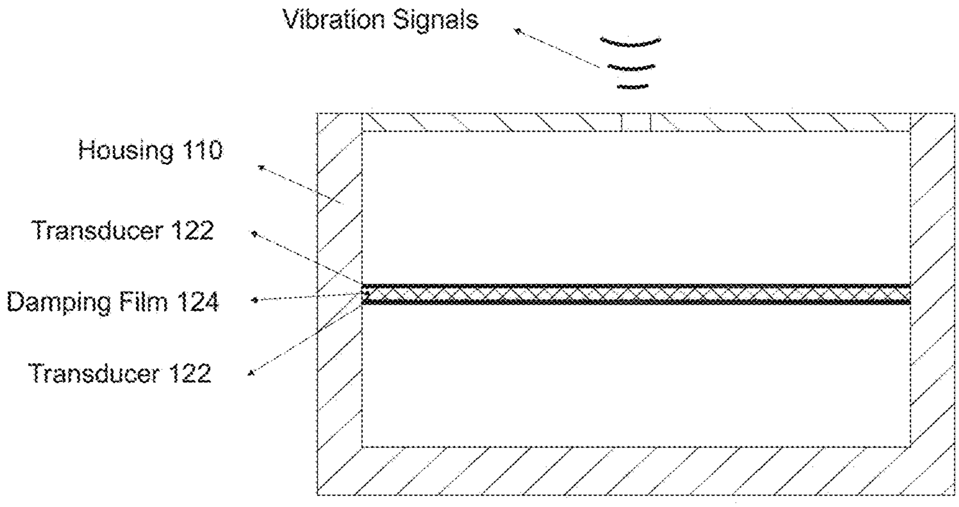
FIG. 19 is a structural schematic diagram illustrating an exemplary microphone according to some embodiments of the present disclosure.

FIG. 19 is a structural schematic diagram illustrating an exemplary microphone 100 according to some embodiments of the present disclosure. As shown in FIG. 19, the microphone 100 may include a housing 110, two transducers 122 connecting to the housing 110, respectively, and a damping film 124 connected to both the transducers 122 and the housing 110. Each of the two transducers 122 may fix to the housing 110 at two ends of each transducer 122. The damping film 124 may connect to the housing 110 at two ends of the damping film 124. The damping film 124 may cover all of an upper surface of one of the two transducers 122 and all of a lower surface of the other of the two transducers 122. As shown in FIG. 19, the two transducers 122 and the damping film 124 may form a sandwich. The damping film 124 may sandwich between the two transducers 122.

Figure 20:
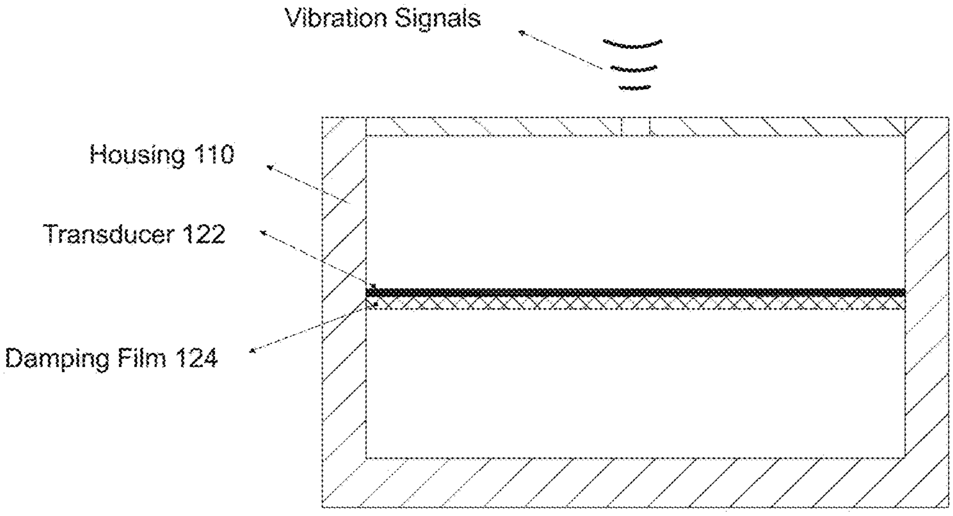
FIG. 20 is a structural schematic diagram illustrating an exemplary microphone according to some embodiments of the present disclosure.

FIG. 20 is a structural schematic diagram illustrating an exemplary microphone 100 according to some embodiments of the present disclosure. As shown in FIG. 20, the microphone 100 may include a housing 110, a transducer 122 connecting to the housing 110, and a damping film 124 connected to both the transducer 122 and the housing 110. The transducer 122 may fix to the housing 110 at two ends of the transducer 122. The damping film 124 may cover all of a lower surface of the transducer 122. The damping film 124 may connect to the housing 110 at two ends of the damping film 124.

Figure 21:
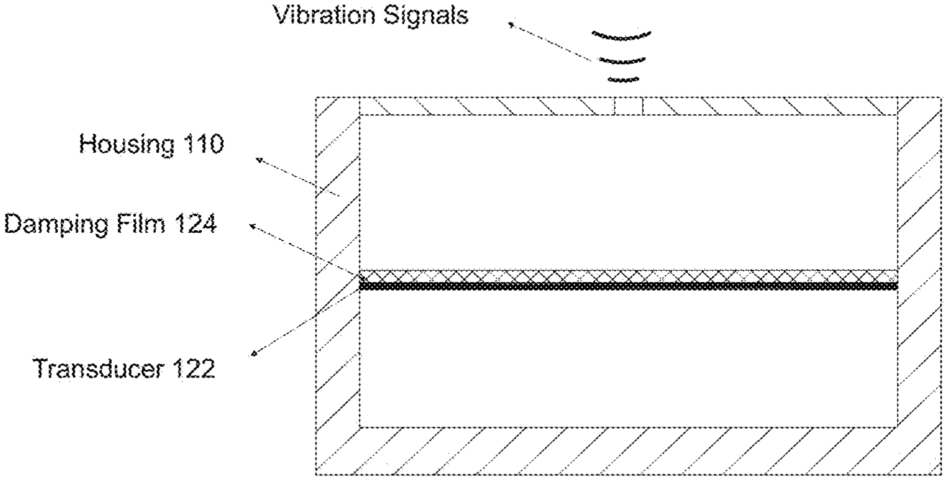
FIG. 21 is a structural schematic diagram illustrating an exemplary microphone according to some embodiments of the present disclosure.

FIG. 21 is a structural schematic diagram illustrating an exemplary microphone 100 according to some embodiments of the present disclosure. As shown in FIG. 21, the microphone 100 may include a housing 110, a transducer 122 connecting to the housing 110, and a damping film 124 connected to both the transducer 122 and the housing 110. The transducer 122 may fix to the housing 110 at two ends of the transducer 122. The damping film 124 may cover all of an upper surface of the transducer 122. The damping film 124 may connect to the housing 110 at two ends of the damping film 124.

Figure 22:
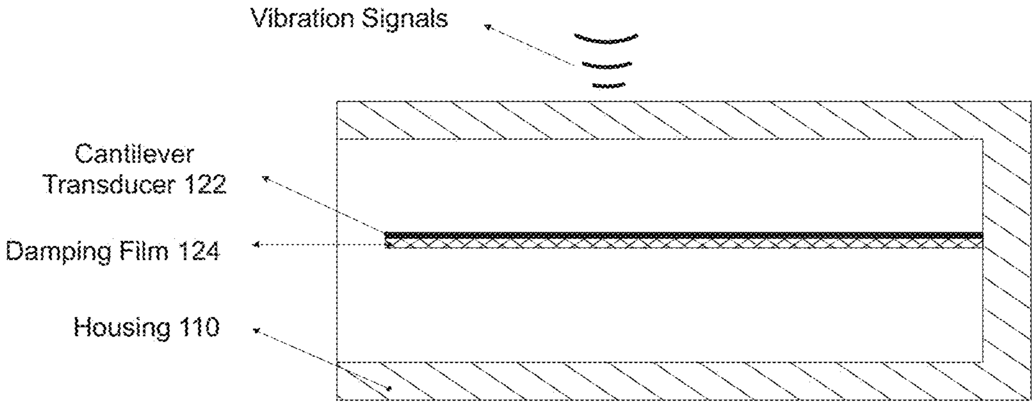
FIG. 22 is a structural schematic diagram illustrating an exemplary microphone according to some embodiments of the present disclosure.

FIG. 22 is a structural schematic diagram illustrating an exemplary microphone 100 according to some embodiments of the present disclosure. As shown in FIG. 22, the microphone 100 may include a housing 110, a cantilever transducer 122 connecting to the housing 110, and a damping film 124 connected to both the transducer 122 and the housing 110. The cantilever transducer 122 may fix to the housing 110 at an end of the cantilever transducer 122. The damping film 124 may cover all of a lower surface of the cantilever transducer 122. The damping film 124 may connect to the housing 110 at an end of the damping film 124.

Figure 23:
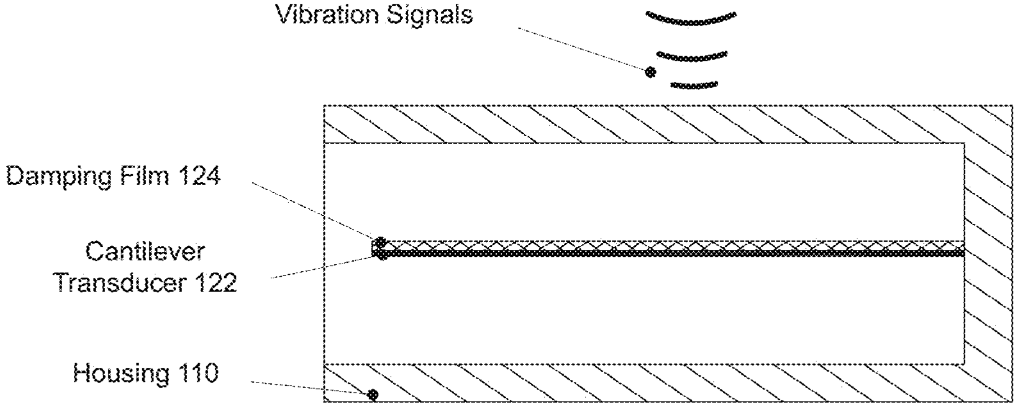
FIG. 23 is a structural schematic diagram illustrating an exemplary microphone according to some embodiments of the present disclosure.

FIG. 23 is a structural schematic diagram illustrating an exemplary microphone 100 according to some embodiments of the present disclosure. As shown in FIG. 23, the microphone 100 may include a housing 110, a cantilever transducer 122 connecting to the housing 110, and a damping film 124 connected to both the transducer 122 and the housing 110. The cantilever transducer 122 may fix to the housing 110 at an end of the cantilever transducer 122. The damping film 124 may cover all of an upper surface of the cantilever transducer 122. The damping film 124 may connect to the housing 110 at an end of the damping film 124.

Figure 24:
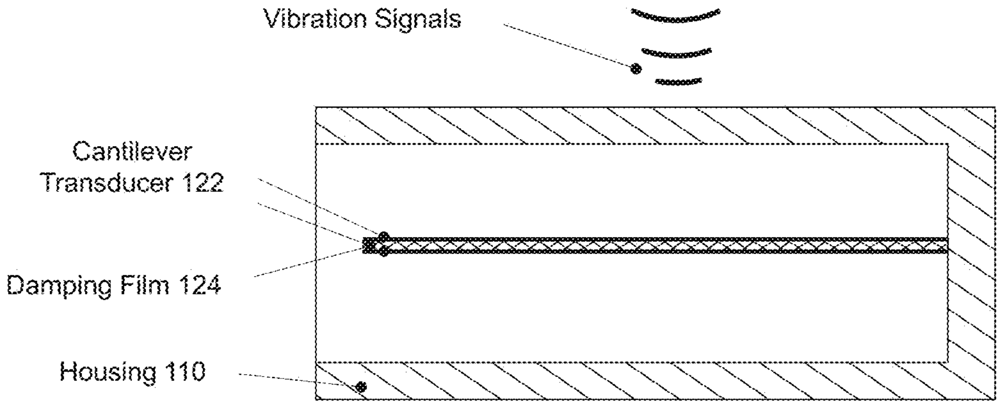
FIG. 24 is a structural schematic diagram illustrating an exemplary microphone according to some embodiments of the present disclosure.

FIG. 24 is a structural schematic diagram illustrating an exemplary microphone 100 according to some embodiments of the present disclosure. As shown in FIG. 24, the microphone 100 may include a housing 110, two cantilever transducers 122 connecting to the housing 110, respectively, and a damping film 124 connected to both the cantilever transducers 122 and the housing 110. Each of the two cantilever transducers 122 may fix to the housing 110 at an end of each cantilever transducer 122. The damping film 124 may cover all of an upper surface of one of the two cantilever transducers 122 and all of a lower surface of the other of the two cantilever transducers 122. As shown in FIG. 24, the two cantilever transducers 122 and the damping film 124 may form a sandwich. The damping film 124 may sandwich between the two cantilever transducers 122. The damping film 124 may connect to the housing 110 at an end of the damping film 124.

Figure 25:
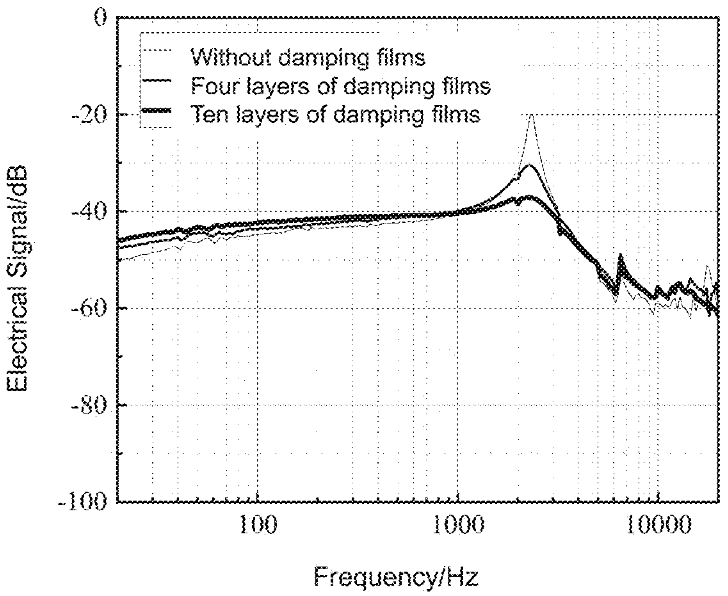
FIG. 25 is a schematic diagram illustrating exemplary frequency response curves of a microphone when damping films are connected to at least one transducer thereof according to some embodiments of the present disclosure.

FIG. 25 is a schematic diagram illustrating exemplary frequency response curves of a microphone 100 when damping films 124 are connected to at least one transducer 122 thereof according to some embodiments of the present disclosure. The frequency response curves of a microphone 100 without damping films 124, a microphone 100 including four layers of damping films 124, and a microphone 100 including ten layers of damping films 124 may be different. As shown in FIG. 25, the resonance peak is constant, sensitivities before the resonance peak improves, and Q value at the resonance peak decreases as a count of layers of damping films 124 increases. The more the damping films 124, the higher sensitivities before the resonance peak, and the smaller of the Q value at the resonance peak.

In some embodiments, the at least one damping film 124 may connect to both the at least one transducer 122 and the housing 110. In some embodiments, the at least one damping film 124 may be disposed on at least one surface of the transducer at a predetermined angle. In some embodiments, the at least one damping film 124 may include at least two damping films 124. In some embodiments, the at least two damping films 124 may be arranged symmetrically with respect to a center line of the transducer 122. In some embodiments, the at least two damping films 124 may be arranged asymmetrically with respect to the center line of the transducer 122. In some embodiments, a width of each of the at least damping film 124 may be the same or different. For example, the width of each of the at least damping film 124 may be variable. In some embodiments, a thickness of each of the at least damping film 124 may be the same or different. For example, the thickness of each of the at least damping film 124 may be variable. In some embodiments, each of the at least one damping film 124 may overlap with part of each of the at least one transducer 122.

Figure 26:
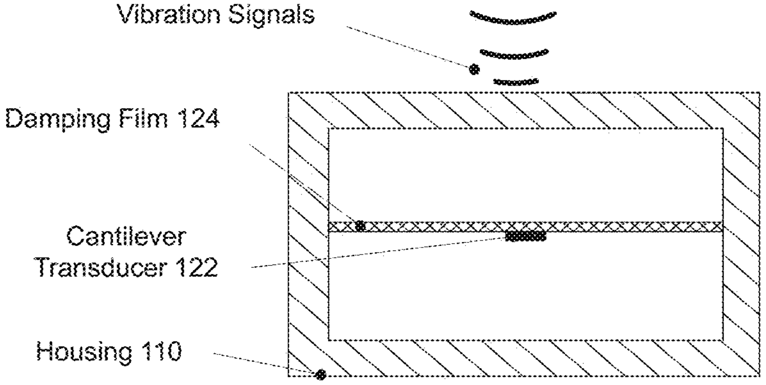
FIG. 26 is a structural schematic diagram illustrating an exemplary microphone according to some embodiments of the present disclosure.

FIG. 26 is a structural schematic diagram illustrating an exemplary microphone 100 according to some embodiments of the present disclosure. As shown in FIG. 26, the microphone 100 may include a housing 110, a cantilever transducer 122 connecting to the housing 110, and a damping film 124 connected to both the cantilever transducer 122 and the housing 110. The cantilever transducer 122 may fix to the housing 110 at an end of the cantilever transducer 122. The damping film 124 may cover all of an upper surface of the cantilever transducer 122. The damping film 124 may connect to the housing 110 at two ends of the damping film 124.

Figure 27:
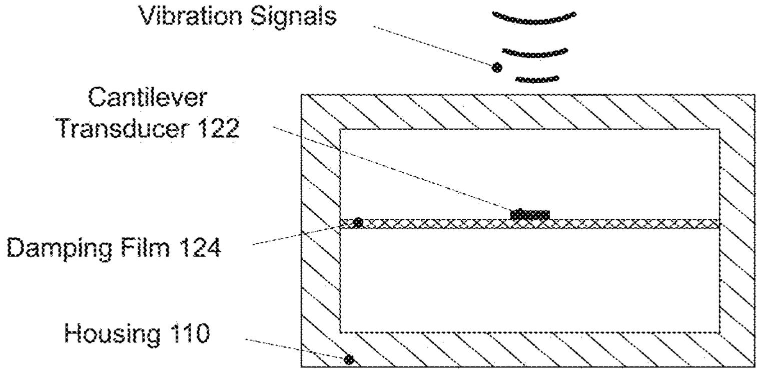
FIG. 27 is a structural schematic diagram illustrating an exemplary microphone according to some embodiments of the present disclosure.

FIG. 27 is a structural schematic diagram illustrating an exemplary microphone 100 according to some embodiments of the present disclosure. As shown in FIG. 27, the microphone 100 may include a housing 110, a cantilever transducer 122 connecting to the housing 110, and a damping film 124 connected to both the cantilever transducer 122 and the housing 110. The cantilever transducer 122 may fix to the housing 110 at an end of the cantilever transducer 122. The damping film 124 may cover all of a lower surface of the cantilever transducer 122. The damping film 124 may connect to the housing 110 at two ends of the damping film 124.

Figure 28:
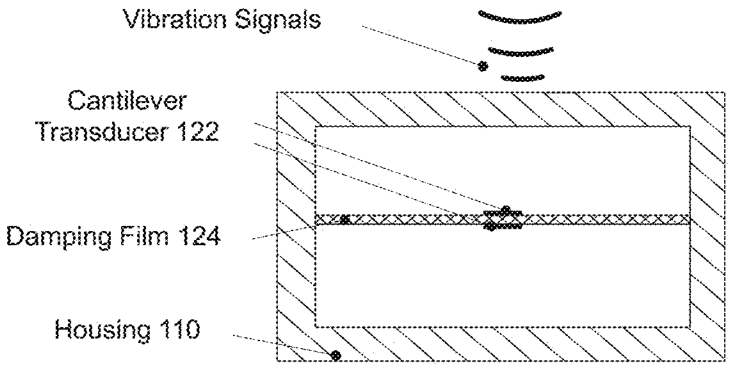
FIG. 28 is a structural schematic diagram illustrating an exemplary microphone according to some embodiments of the present disclosure.

FIG. 28 is a structural schematic diagram illustrating an exemplary microphone 100 according to some embodiments of the present disclosure. As shown in FIG. 28, the microphone 100 may include a housing 110, two cantilever transducers 122 connecting to the housing 110, respectively, and a damping film 124 connected to both the cantilever transducers 122 and the housing 110. Each of the two cantilever transducers 122 may fix to the housing 110 at two ends of each cantilever transducer 122. The damping film 124 may connect to the housing 110 at two ends of the damping film 124. The damping film 124 may cover all of an upper surface of one of the two cantilever transducers 122 and all of a lower surface of the other of the two cantilever transducers 122. As shown in FIG. 28, the two cantilever transducers 122 and the damping film 124 may form a sandwich. The damping film 124 may sandwich between the two cantilever transducers 122.

Figure 29:
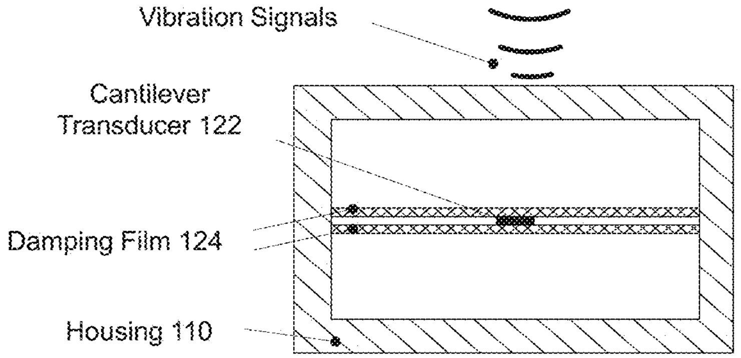
FIG. 29 is a structural schematic diagram illustrating an exemplary microphone according to some embodiments of the present disclosure.

FIG. 29 is a structural schematic diagram illustrating an exemplary microphone 100 according to some embodiments of the present disclosure. As shown in FIG. 29, the microphone 100 may include a housing 110, a cantilever transducer 122 connecting to the housing 110, and two damping films 124 connected to both the cantilever transducer 122, respectively, and the housing 110. The cantilever transducer 122 may fix to the housing 110 at an end of the cantilever transducer 122. Each of the two damping films 124 may connect to the housing 110 at two ends of each damping film 124. The two damping films 124 may cover all of an upper surface and all of a lower surface of the cantilever transducer 122, respectively. As shown in FIG. 29, the two damping films 124 and the cantilever transducer 122 may form a sandwich. The cantilever transducer 122 may sandwich between the two damping films 124.

Figure 30:
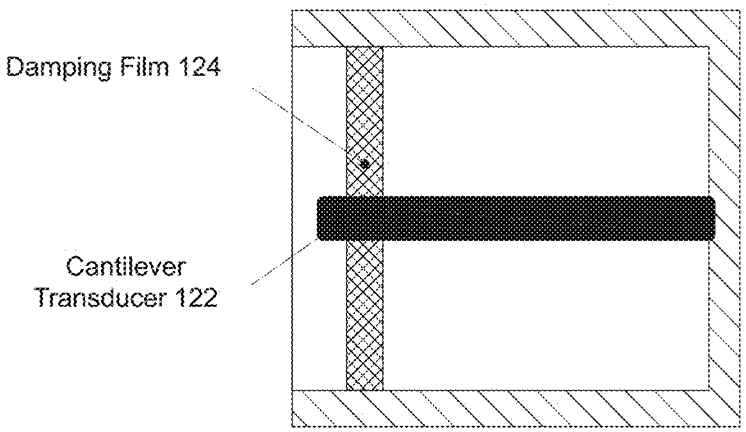
FIG. 30 is a structural schematic diagram illustrating an exemplary microphone according to some embodiments of the present disclosure.

FIG. 30 is a structural schematic diagram illustrating an exemplary microphone 100 according to some embodiments of the present disclosure. As shown in FIG. 30, the microphone 100 may include a housing 110, a cantilever transducer 122 connecting to the housing 110, and two damping films 124 connected to both the cantilever transducer 122, respectively, and the housing 110. The cantilever transducer 122 may fix to the housing 110 at an end of the cantilever transducer 122. Each of the two damping films 124 may connect to the housing 110 at an end of each damping film 124 and connect to the cantilever transducer 122 at the other end of each damping film. The two damping films 124 may cover part of an upper surface and part of a lower surface of the cantilever transducer 122, respectively. As shown in FIG. 30, the two damping films 124 may be disposed on the upper surface and the lower surface of the cantilever transducer 122 at 90°. The overlap parts of the two damping films 124 and the cantilever transducer 122 may be close to an end other than the fixed end of the cantilever transducer 122. The thickness of each of the two damping films 124 may be constant and same with each other.

Figure 31:
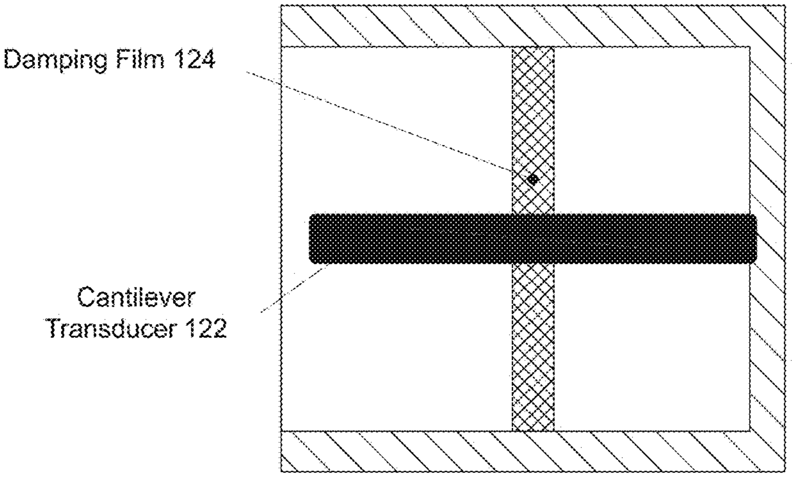
FIG. 31 is a structural schematic diagram illustrating an exemplary microphone according to some embodiments of the present disclosure.

FIG. 31 is a structural schematic diagram illustrating an exemplary microphone 100 according to some embodiments of the present disclosure. As shown in FIG. 31, the microphone 100 may include a housing 110, a cantilever transducer 122 connecting to the housing 110, and two damping films 124 connected to both the cantilever transducer 122, respectively, and the housing 110. The cantilever transducer 122 may fix to the housing 110 at an end of the cantilever transducer 122. Each of the two damping films 124 may connect to the housing 110 at an end of each damping film 124 and connect to the cantilever transducer 122 at the other end of each damping film. The two damping films 124 may cover part of an upper surface and part of a lower surface of the cantilever transducer 122, respectively. As shown in FIG. 31, the two damping films 124 may be disposed on the upper surface and the lower surface of the cantilever transducer 122 at 90°. The overlap parts of the two damping films 124 and the cantilever transducer 122 may be close to a center line of the cantilever transducer 122. The thickness of each of the two damping films 124 may be constant and same with each other.

Figure 32:
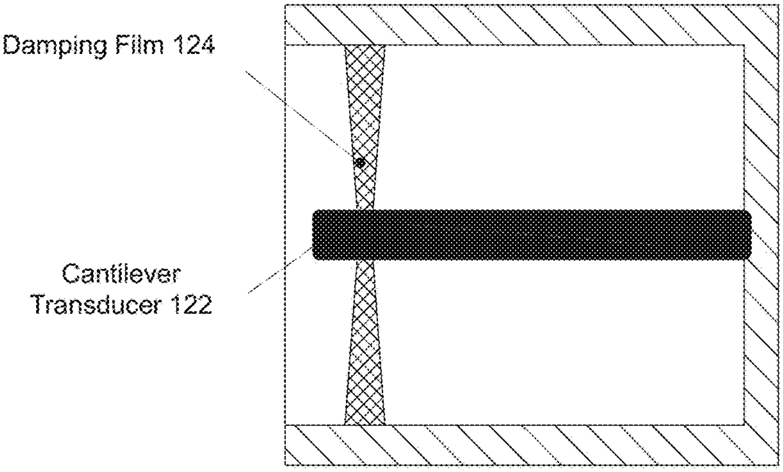
FIG. 32 is a structural schematic diagram illustrating an exemplary microphone according to some embodiments of the present disclosure.

FIG. 32 is a structural schematic diagram illustrating an exemplary microphone 100 according to some embodiments of the present disclosure. As shown in FIG. 32, the microphone 100 may include a housing 110, a cantilever transducer 122 connecting to the housing 110, and two damping films 124 connected to both the cantilever transducer 122, respectively, and the housing 110. The cantilever transducer 122 may fix to the housing 110 at an end of the cantilever transducer 122. Each of the two damping films 124 may connect to the housing 110 at an end of each damping film 124 and connect to the cantilever transducer 122 at the other end of each damping film. The two damping films 124 may cover part of an upper surface and part of a lower surface of the cantilever transducer 122, respectively. As shown in FIG. 32, the two damping films 124 may be disposed on the upper surface and the lower surface of the cantilever transducer 122 at 90°. The overlap parts of the two damping films 124 and the cantilever transducer 122 may be close to an end other than the fixed end of the cantilever transducer 122. The thickness of each of the two damping films 124 may be variable. The thickness of the damping films 124 connected to the cantilever transducer 122 may be less than the thickness of the damping films 124 connected to the housing 110.

Figure 33:
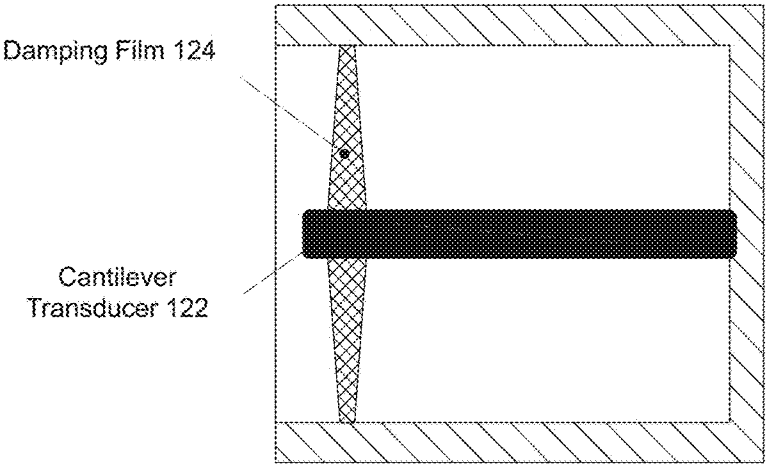
FIG. 33 is a structural schematic diagram illustrating an exemplary microphone according to some embodiments of the present disclosure.

FIG. 33 is a structural schematic diagram illustrating an exemplary microphone 100 according to some embodiments of the present disclosure. As shown in FIG. 33, the microphone 100 may include a housing 110, a cantilever transducer 122 connecting to the housing 110, and two damping films 124 connected to both the cantilever transducer 122, respectively, and the housing 110. The cantilever transducer 122 may fix to the housing 110 at an end of the cantilever transducer 122. Each of the two damping films 124 may connect to the housing 110 at an end of each damping film 124 and connect to the cantilever transducer 122 at the other end of each damping film. The two damping films 124 may cover part of an upper surface and part of a lower surface of the cantilever transducer 122, respectively. As shown in FIG. 33, the two damping films 124 may be disposed on the upper surface and the lower surface of the cantilever transducer 122 at 90°. The overlap parts of the two damping films 124 and the cantilever transducer 122 may be close to an end other than the fixed end of the cantilever transducer 122. The thickness of each of the two damping films 124 may be variable. The thickness of the damping films 124 connected to the cantilever transducer 122 may be greater than the thickness of the damping films 124 connected to the housing 110.

Figure 34:
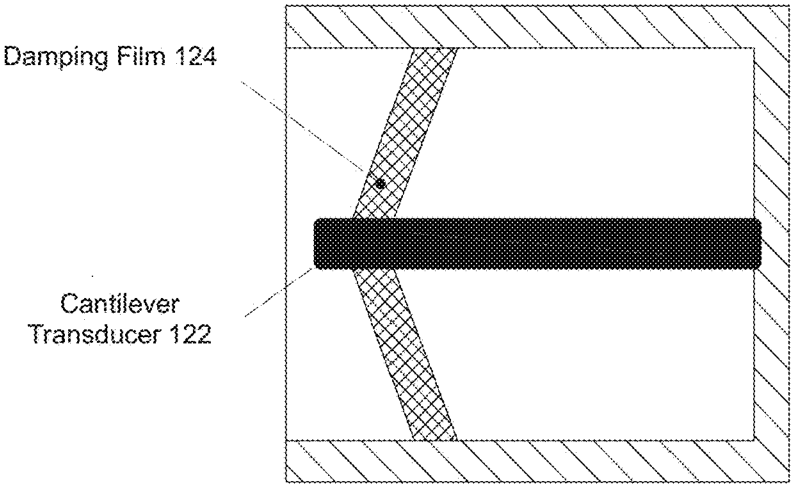
FIG. 34 is a structural schematic diagram illustrating an exemplary microphone according to some embodiments of the present disclosure.

FIG. 34 is a structural schematic diagram illustrating an exemplary microphone 100 according to some embodiments of the present disclosure. As shown in FIG. 34, the microphone 100 may include a housing 110, a cantilever transducer 122 connecting to the housing 110, and two damping films 124 connected to both the cantilever transducer 122, respectively, and the housing 110. The cantilever transducer 122 may fix to the housing 110 at an end of the cantilever transducer 122. Each of the two damping films 124 may connect to the housing 110 at an end of each damping film 124 and connect to the cantilever transducer 122 at the other end of each damping film. The two damping films 124 may cover part of an upper surface and part of a lower surface of the cantilever transducer 122, respectively. As shown in FIG. 34, the two damping films 124 may be disposed on the upper surface and the lower surface of the cantilever transducer 122 at an angle between 60° and 90°. The overlap parts of the two damping films 124 and the cantilever transducer 122 may be close to an end other than the fixed end of the cantilever transducer 122. The thickness of each of the two damping films 124 may be constant and same with each other.

Figure 35:
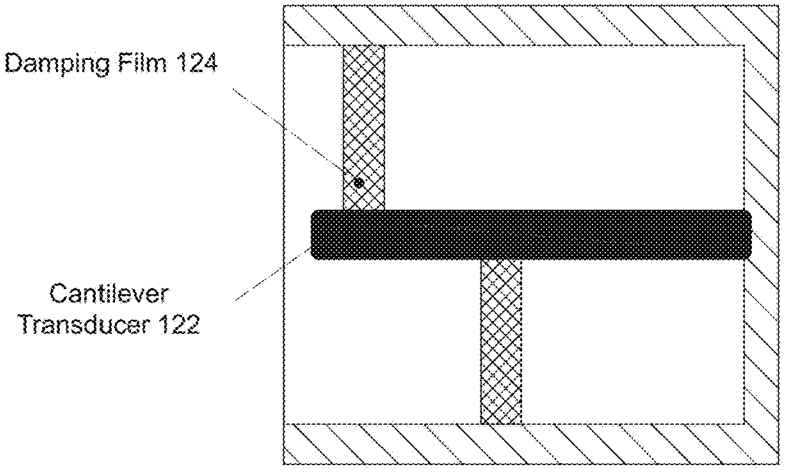
FIG. 35 is a structural schematic diagram illustrating an exemplary microphone according to some embodiments of the present disclosure.

FIG. 35 is a structural schematic diagram illustrating an exemplary microphone 100 according to some embodiments of the present disclosure. As shown in FIG. 35, the microphone 100 may include a housing 110, a cantilever transducer 122 connecting to the housing 110, and two damping films 124 connected to both the cantilever transducer 122, respectively, and the housing 110. The cantilever transducer 122 may fix to the housing 110 at an end of the cantilever transducer 122. Each of the two damping films 124 may connect to the housing 110 at an end of each damping film 124 and connect to the cantilever transducer 122 at the other end of each damping film. The two damping films 124 may cover part of an upper surface and part of a lower surface of the cantilever transducer 122, respectively. As shown in FIG. 35, the two damping films 124 may be disposed on the upper surface and the lower surface of the cantilever transducer 122 at 90°. The overlap part of one of the two damping films

124 and the cantilever transducer 122 may be close to an end other than the fixed end of the cantilever transducer 122, and overlap part of the other of the two damping films 124 and the cantilever transducer 122 may be close to a center line of the cantilever transducer 122. The thickness of each of the two damping films 124 may be constant and same with each other.

Figure 36:
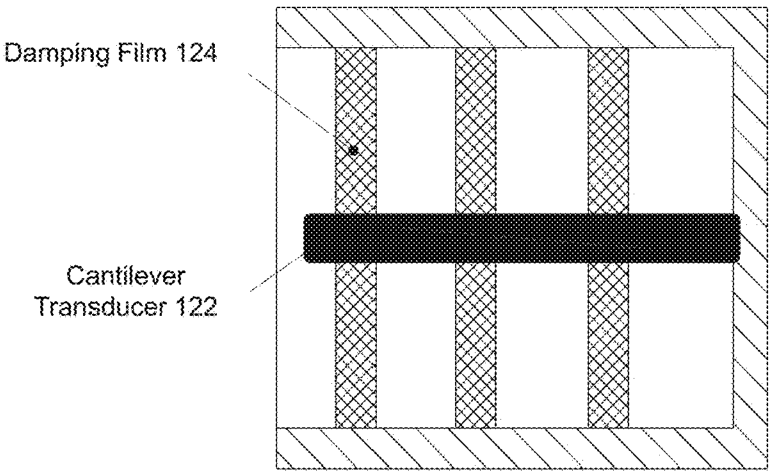
FIG. 36 is a structural schematic diagram illustrating an exemplary microphone according to some embodiments of the present disclosure.

FIG. 36 is a structural schematic diagram illustrating an exemplary microphone 100 according to some embodiments of the present disclosure. As shown in FIG. 36, the microphone 100 may include a housing 110, a cantilever transducer 122 connecting to the housing 110, and six damping films 124 each connected to both the cantilever transducer 122 and the housing 110. The cantilever transducer 122 may fix to the housing 110 at an end of the cantilever transducer 122. Each of the two damping films 124 may connect to the housing 110 at an end of each damping film 124 and connect to the cantilever transducer 122 at the other end of each damping film. Each of the six damping films 124 may cover part of an upper surface or part of a lower surface of the cantilever transducer 122. As shown in FIG. 36, each of the six damping films 124 may be disposed on the upper surface or the lower surface of the cantilever transducer 122 at 90°. The overlap part of each of the six damping films 124 and the cantilever transducer 122 may be distributed from the fixed end of the cantilever transducer 122 to the other end. The thickness of each of the six damping films 124 may be constant and same with each other.

Figure 37:
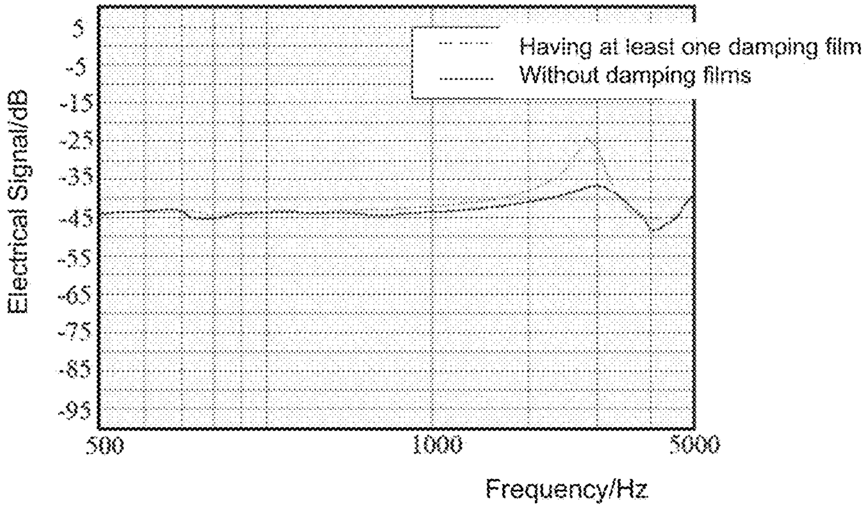
FIG. 37 is a schematic diagram illustrating exemplary frequency response curves of a microphone without damping films and a microphone including at least one damping film disposed on a surface of a cantilever transducer at 90° according to some embodiments of the present disclosure.

FIG. 37 is a schematic diagram illustrating exemplary frequency response curves of a microphone 100 without damping films and a microphone 100 including at least one damping film 124 disposed on a surface of a cantilever transducer 122 at 90° according to some embodiments of the present disclosure. As shown in FIG. 37, the resonance frequency increases, the Q value at the resonance peak decreases after adding the at least one damping film 124. The sensitivities at frequencies other than the resonance peak may be generally constant no matter whether adding the at least one damping film 124 or not.

In some embodiments, the microphone 100 may include a transducer 122, at least one damping film 124, and at least one elastic element 126. The at least one damping film may be connected to the transducer 122 and the at least one elastic element 126, respectively. In some embodiments, the microphone 100 may include a plurality of transducers 122 and at least one damping film 124. In some embodiments, the microphone 100 may include a plurality of transducers 122, at least one damping film 124, and at least one elastic element 126. The at least one damping film may be connected to the transducer 122 and the at least one elastic element 126, respectively. In some embodiments, the at least one elastic element 126 and the transducer 122 (or the plurality of transducers 122) may be arranged in a predetermined distribution mode. In some embodiments, the predetermined distribution mode may include a horizontal distribution mode, a vertical distribution mode, an array distribution mode, a random distribution mode, or the like, or any combination thereof. In some embodiments, the at least one damping film 124 may cover at least part of at least one surface of the at least one elastic element 126.

Figure 38:
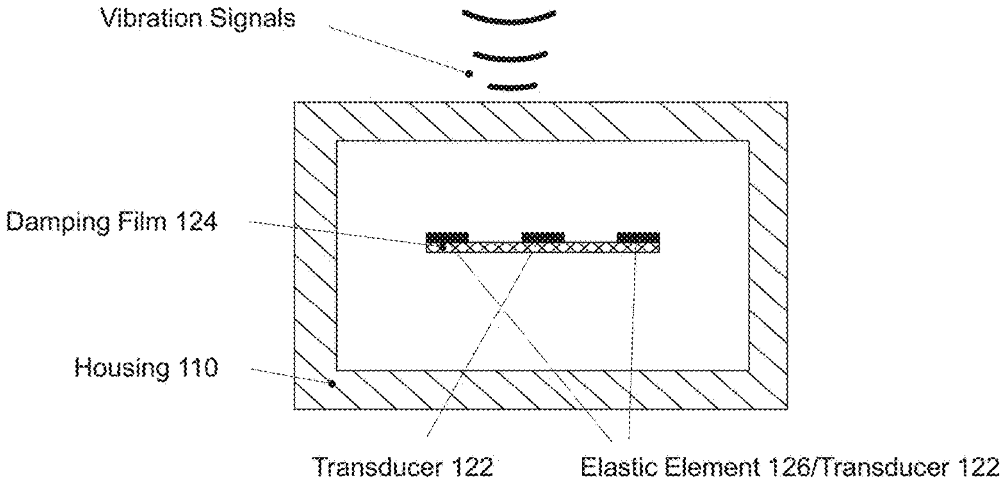
FIG. 38 is a structural schematic diagram illustrating an exemplary microphone according to some embodiments of the present disclosure.

FIG. 38 is a structural schematic diagram illustrating an exemplary microphone 100 according to some embodiments of the present disclosure. As shown in FIG. 38, the microphone 100 may include a housing 110, a transducer 122, a damping film 124, and two elastic elements 126 (or two transducers 122, or an elastic element 126 and a transducer 122). The damping film 124 may cover all of a lower surface of each of the transducer(s) 122 and/or the elastic element(s) 126. The damping film 124 may not connect to the housing 110.

Figure 39:
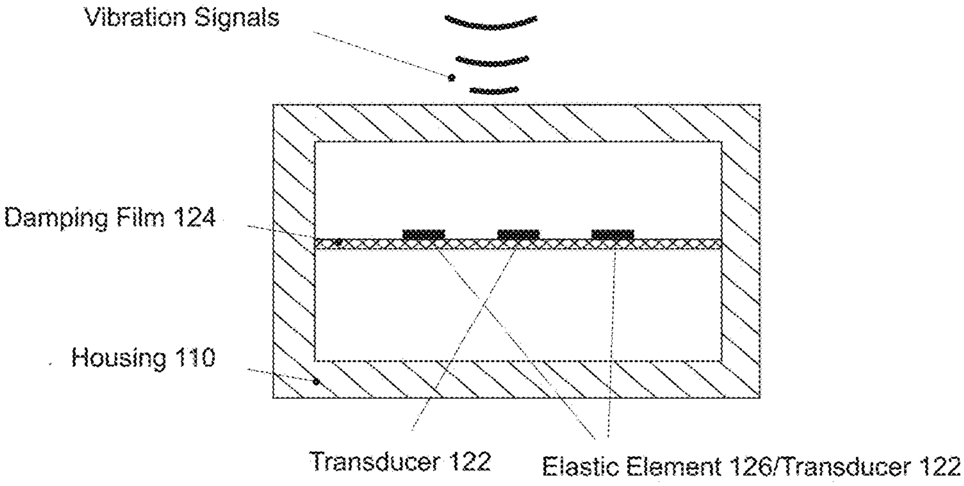
FIG. 39 is a structural schematic diagram illustrating an exemplary microphone according to some embodiments of the present disclosure.

FIG. 39 is a structural schematic diagram illustrating an exemplary microphone 100 according to some embodiments of the present disclosure. As shown in FIG. 39, the microphone 100 may include a housing 110, a transducer 122, a damping film 124, and two elastic elements 126 (or two transducers 122, or an elastic element 126 and a transducer 122). The damping film 124 may cover all of a lower surface of each of the transducer(s) 122 and/or the elastic element(s) 126. The damping film 124 may connect to the housing 110 at two ends of the damping film 124.

Figure 40:
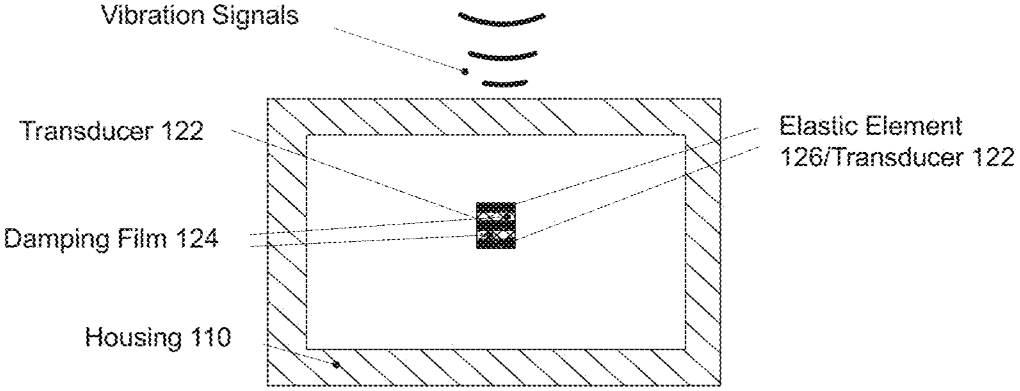
FIG. 40 is a structural schematic diagram illustrating an exemplary microphone according to some embodiments of the present disclosure.

FIG. 40 is a structural schematic diagram illustrating an exemplary microphone 100 according to some embodiments of the present disclosure. As shown in FIG. 40, the microphone 100 may include a housing 110, two transducers 122, a damping film 124, and two elastic elements 126 (or two transducers 122, or an elastic element 126 and a transducer 122). Each of the two damping films 124 may sandwich between two of the transducer(s) 122 and/or the elastic element(s) 126. The damping film 124 may not connect to the housing 110.

Figure 41:
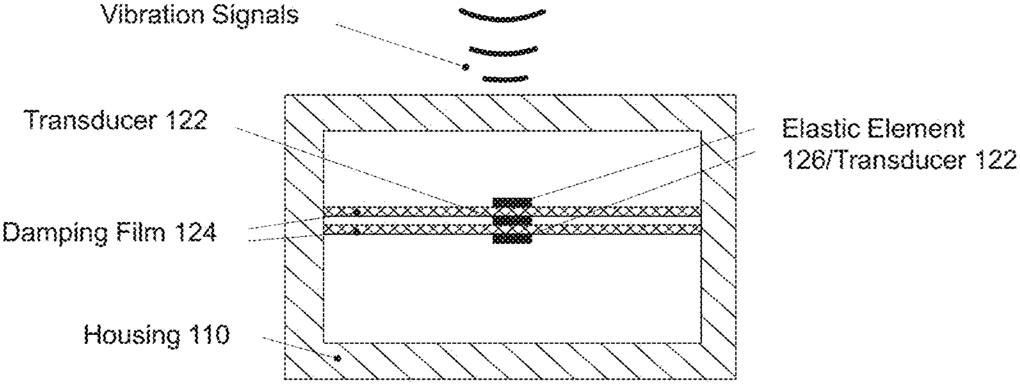
FIG. 41 is a structural schematic diagram illustrating an exemplary microphone according to some embodiments of the present disclosure.

FIG. 41 is a structural schematic diagram illustrating an exemplary microphone 100 according to some embodiments of the present disclosure. As shown in FIG. 41, the microphone 100 may include a housing 110, two transducers 122, a damping film 124, and two elastic elements 126 (or two transducers 122, or an elastic element 126 and a transducer 122). Each of the two damping films 124 may sandwich between two of the transducer(s) 122 and/or the elastic element(s) 126. Each of the two damping films 124 may connect to the housing 110 at two ends of each damping film 124.

Figure 42:
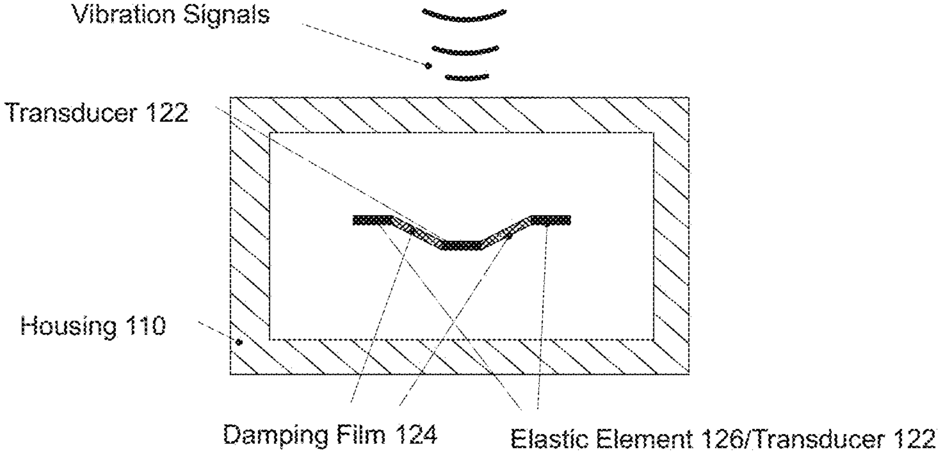
FIG. 42 is a structural schematic diagram illustrating an exemplary microphone according to some embodiments of the present disclosure.

FIG. 42 is a structural schematic diagram illustrating an exemplary microphone 100 according to some embodiments of the present disclosure. As shown in FIG. 42, the microphone 100 may include a housing 110, a transducer 122, two damping films 124, and two elastic elements 126 (or two transducers 122, or an elastic element 126 and a transducer 122). Each of the two damping films 124 may connect to an end of the transducer(s) 122 and/or the elastic element(s) 126. For example, the microphone 100 may include an elastic element 126 (or a transducer 122) connecting to a damping film 124 connecting to a transducer 122 connecting to a damping film 124 connecting to an elastic element 126 (or a transducer 122) in turn. The transducer 122, the two damping films 124, and the two elastic elements 126 (or two transducers 122, or an elastic element 126 and a transducer 122) may form a similar "V" shape inside the housing 110. The two damping films 124 or the two elastic elements 126 (or two transducers 122, or an elastic element 126 and a transducer 122) may be symmetrical with respect to a center line of the transducer 122. The two damping films 124 may not connect to the housing 110.

Figure 43:
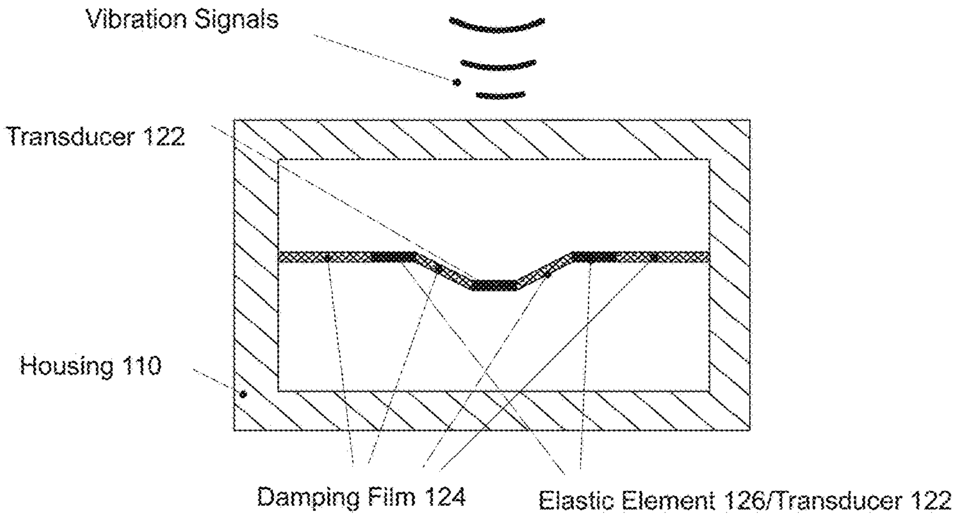
FIG. 43 is a structural schematic diagram illustrating an exemplary microphone according to some embodiments of the present disclosure.

FIG. 43 is a structural schematic diagram illustrating an exemplary microphone 100 according to some embodiments of the present disclosure. As shown in FIG. 43, the microphone 100 may include a housing 110, a transducer 122, four damping films 124, and two elastic elements 126 (or two transducers 122, or an elastic element 126 and a transducer 122). Each of the two damping films 124 may connect to an end of the transducer(s) 122 and/or the elastic element(s) 126. For example, the microphone 100 may include a damping film 124 connecting to an elastic element 126 (or a transducer 122) connecting to a damping film 124 connecting to a transducer 122 connecting to a damping film

124 connecting to an elastic element 126 (or a transducer 122) in turn. The transducer 122, the four damping films 124, and the two elastic elements 126 (or two transducers 122, or an elastic element 126 and a transducer 122) may form a similar "V" shape inside the housing 110. Two of the four damping films 124 or the two elastic elements 126 (or two transducers 122, or an elastic element 126 and a transducer 122) may be symmetrical with respect to a center line of the transducer 122. Two of the four damping films 124 may connect to the housing 110, respectively.

Figure 44:
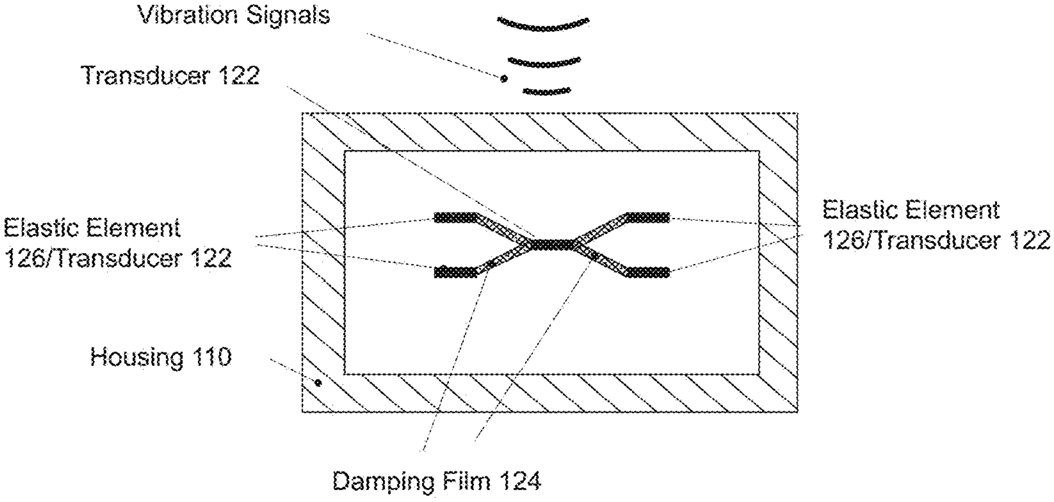
FIG. 44 is a structural schematic diagram illustrating an exemplary microphone according to some embodiments of the present disclosure.

FIG. 44 is a structural schematic diagram illustrating an exemplary microphone 100 according to some embodiments of the present disclosure. As shown in FIG. 44, the microphone 100 may include a housing 110, a transducer 122, four damping films 124, and four elastic elements 126 (or four transducers 122, or an elastic element 126 and three transducers 122, or two elastic elements 126 and two transducers 122, or three elastic elements 126 and a transducer 122). Each of the four damping films 124 may connect to an end of the transducer(s) 122 and/or the elastic element(s) 126. The transducer 122, the four damping films 124, and the four elastic elements 126 (or four transducers 122, or an elastic element 126 and three transducers 122, or two elastic elements 126 and two transducers 122, or three elastic elements 126 and a transducer 122) may form a similar "X" shape inside the housing 110. Two of the four damping films 124 or two of the four elastic elements 126 (or four transducers 122, or an elastic element 126 and three transducers 122, or two elastic elements 126 and two transducers 122, or three elastic elements 126 and a transducer 122) may be symmetrically with respect to a center line of the transducer 122. The four damping films 124 may not connect to the housing 110.

Figure 45:
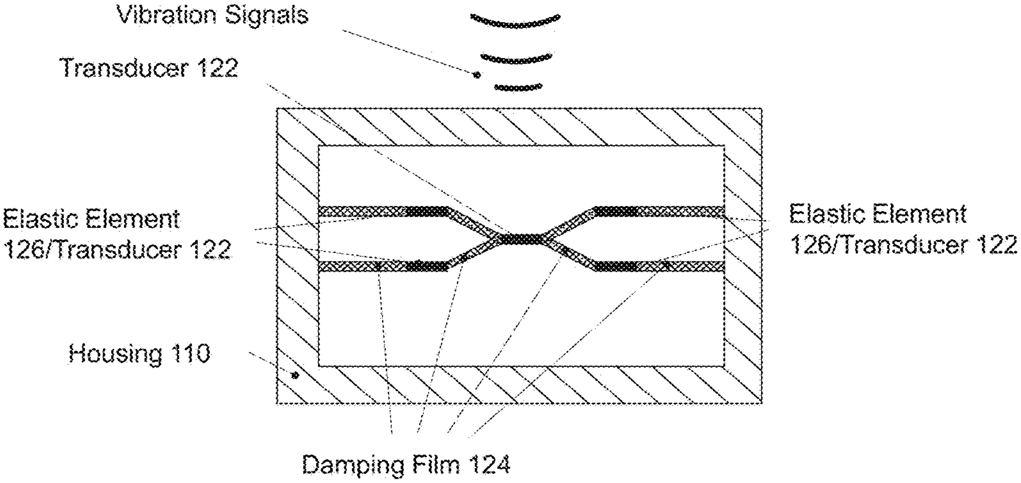
FIG. 45 is a structural schematic diagram illustrating an exemplary microphone according to some embodiments of the present disclosure.

FIG. 45 is a structural schematic diagram illustrating an exemplary microphone 100 according to some embodiments of the present disclosure. As shown in FIG. 45, the microphone 100 may include a housing 110, a transducer 122, six damping films 124, and four elastic elements 126 (or four transducers 122, or an elastic element 126 and three transducers 122, or two elastic elements 126 and two transducers 122, or three elastic elements 126 and a transducer 122). Each of the four damping films 124 may connect to an end of the transducer(s) 122 and/or the elastic element(s) 126. The transducer 122, the six damping films 124, and the four elastic elements 126 (or four transducers 122, or an elastic element 126 and three transducers 122, or two elastic elements 126 and two transducers 122, or three elastic elements 126 and a transducer 122) may form a similar "X" shape inside the housing 110. Two of the six damping films 124 or two of the four elastic elements 126 (or four transducers 122, or an elastic element 126 and three transducers 122, or two elastic elements 126 and two transducers 122, or three elastic elements 126 and a transducer 122) may be symmetrically with respect to a center line of the transducer 122. Four of the six damping films 124 may connect to the housing 110.

Figure 46:
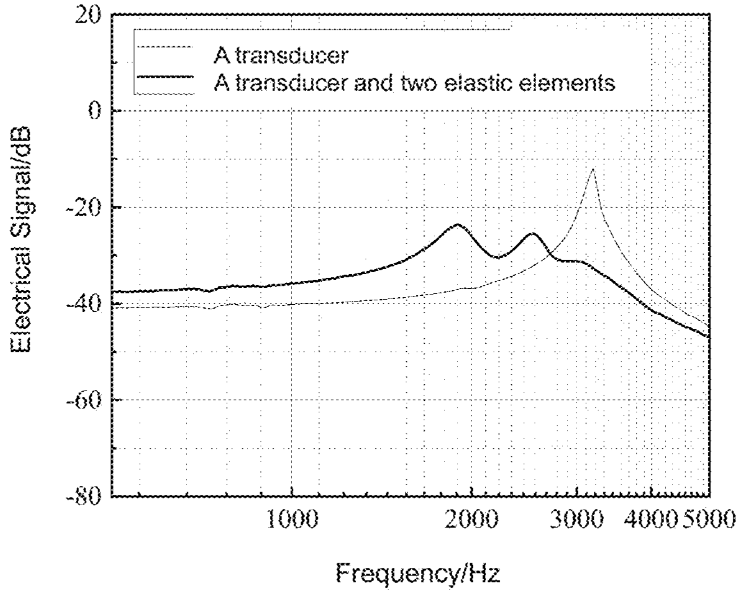
FIG. 46 is a schematic diagram illustrating exemplary frequency response curves of a microphone including a transducer and a microphone including a transducer and two elastic elements according to some embodiments of the present disclosure.

FIG. 46 is a schematic diagram illustrating exemplary frequency response curves of a microphone 100 including a transducer 122 and a microphone 100 including a transducer 122 and two elastic elements 126 according to some embodiments of the present disclosure. As shown in FIG. 46, the frequency response curve of the microphone 100 including a transducer 122 and two elastic elements 126 may include three resonance peaks. The frequency response curve of the microphone 100 including a transducer 122 may include only one resonance peak. The sensitivities before the resonance peak of the microphone 100 including the two elastic elements 126 may be greater than that of the microphone 100 including only one transducer 122. The Q value before the resonance peak of the microphone 100 including the two elastic elements 126 may be smaller than that of the microphone 100 including only one transducer 122.

Figure 47:
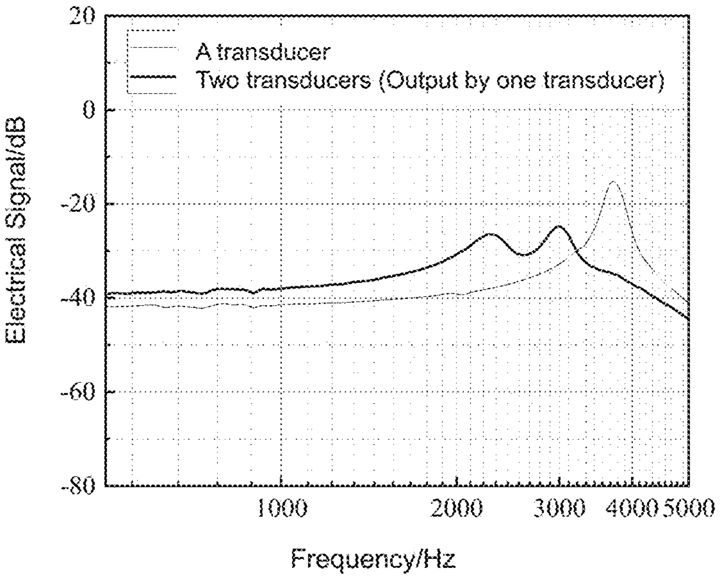
FIG. 47 is a schematic diagram illustrating exemplary frequency response curves of a microphone including a transducer and a microphone including two transducers (output by one transducer) according to some embodiments of the present disclosure.

FIG. 47 is a schematic diagram illustrating exemplary frequency response curves of a microphone 100 including a transducer 122 and a microphone 100 including two transducers 122 (output by one transducer 122) according to some embodiments of the present disclosure. As shown in FIG. 47, the frequency response curve of the microphone 100 including two transducers 122 may include two resonance peaks. The frequency response curve of the microphone 100 including a transducer 122 may include only one resonance peak. The sensitivities before the resonance peak of the microphone 100 including two transducers 122 may be greater than that of the microphone 100 including only one transducer 122. The Q value before the resonance peak of the microphone 100 including two transducers 122 may be smaller than that of the microphone 100 including only one transducer 122.

It should be noted that the exemplary microphones described in the present disclosure are merely provided for the purposes of illustration, and not intended to limit the scope of the present disclosure. Various modifications to the disclosed embodiments will be readily apparent to those skilled in the art, and the general principles defined herein may be applied to other embodiments and applications without departing from the spirit and scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A microphone comprising:
- a housing for receiving vibration signals;
- a converting component inside the housing for converting the vibration signals into electrical signals, wherein the converting component includes:
  - a transducer;
  - at least one damping film attached to the transducer; and
  - at least one elastic element, wherein the at least one damping film is connected to the transducer and the at least one elastic element respectively, and a resonance frequency of each of the at least one elastic elements is within a predetermined voice frequency range; and
- a processing circuit for processing the electrical signals.

2. The microphone of claim 1, wherein the at least one damping film covers at least part of at least one surface of the transducer.

3. The microphone of claim 2, wherein the at least one surface of the transducer includes at least one of an upper surface, a lower surface of the transducer, a lateral surface, or an internal surface of the transducer.

4. The microphone of claim 1, wherein the at least one damping film is disposed on at least one position including an upper surface of the transducer, a lower surface of the transducer, a lateral surface of the transducer, or an interior of the transducer.

5. The microphone of claim 1, wherein the at least one damping film is disposed on at least one surface of the transducer at a predetermined angle.

6. The microphone of claim 1, wherein the at least one damping film is not connected to the housing.

7. The microphone of claim 1, wherein the at least one damping film is connected to the housing.

8. The microphone of claim 1, wherein the at least one damping film includes at least two damping films, and the at least two damping films are arranged symmetrically with respect to a center line of the transducer.

9. The microphone of claim 1, wherein the at least one elastic elements and the transducer are arranged in a predetermined distribution mode.

10. The microphone of claim 9, wherein the predetermined distribution mode includes at least one of a horizontal distribution mode, a vertical distribution mode, an array distribution mode, or a random distribution mode.

11. The microphone of claim 1, wherein the at least one damping film covers at least part of at least one surface of each of the at least one elastic elements.

12. The microphone of claim 1, wherein a width of the at least one damping film is variable.

13. The microphone of claim 1, wherein a thickness of the at least one damping film is variable.

14. The microphone of claim 1, wherein the transducer includes at least one of a diaphragm, a piezo ceramic plate, a piezo film, or an electrostatic film.

15. The microphone of claim 1, wherein a structure of the transducer includes at least one of a film, a cantilever, or a plate.

16. The microphone of claim 1, wherein the vibration signals are caused by at least one of: gas, liquid, or solid.

17. The microphone of claim 1, wherein the vibration signals are transmitted from the housing to the converting component according to a non-contact mode or a contact mode.

18. The microphone of claim 1, wherein the transducer and the at least one damping film are designed according to a frequency response curve of the microphone.

19. The microphone of claim 1, wherein the at least one elastic element includes at least two elastic elements, wherein the at least one damping film is connected to the transducer and the at least two elastic elements respectively, and a resonance frequency of each of the at least two elastic elements is different from each other.

20. An electronic device comprising a microphone, wherein the microphone includes:

a housing for receiving vibration signals;

a converting component inside the housing for converting the vibration signals into electrical signals, wherein the converting component includes:

a transducer;

at least one damping film attached to the transducer; and at least one elastic element, wherein the at least one damping film is connected to the transducer and the at least one elastic element respectively, and a resonance frequency of each of the at least one elastic elements is within a predetermined voice frequency range; and a processing circuit for processing the electrical signals.

* * * * *